(12) United States Patent
Haberman

(10) Patent No.: US 12,301,947 B2
(45) Date of Patent: May 13, 2025

(54) SYSTEM AND METHOD FOR ENHANCED VIDEO SELECTION

(71) Applicant: Adeia Media Holdings LLC, San Jose, CA (US)

(72) Inventor: Seth Haberman, New York, NY (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 18/441,655

(22) Filed: Feb. 14, 2024

(65) Prior Publication Data

US 2024/0187701 A1 Jun. 6, 2024

Related U.S. Application Data

(63) Continuation of application No. 17/138,192, filed on Dec. 30, 2020, now Pat. No. 11,936,956, which is a
(Continued)

(51) Int. Cl.
*H04N 21/482* (2011.01)
*G06F 16/58* (2019.01)
(Continued)

(52) U.S. Cl.
CPC .......... *H04N 21/482* (2013.01); *G06F 16/58* (2019.01); *G06F 16/738* (2019.01); *G06F 16/74* (2019.01);
(Continued)

(58) Field of Classification Search
CPC .................................................. H04N 5/44543
(Continued)

(56) References Cited

U.S. PATENT DOCUMENTS 3,366,731 A 1/1968 Edward
3,639,686 A 2/1972 Walker et al.
(Continued)

FOREIGN PATENT DOCUMENTS

EP 1096453 A2 5/2001
JP 10162028 6/1998
(Continued)

OTHER PUBLICATIONS

Communication for EPO including Supplementary European Search Report for Application No. EP 07 83 6534 dated Apr. 13, 2010 (6 pgs.).
(Continued)

*Primary Examiner* — Hung T Vy
(74) *Attorney, Agent, or Firm* — Haley Guiliano LLP

(57) ABSTRACT

A system and method for presenting video asset information to a viewer to assist the view in selecting a video asset for viewing. The video assets can be available from a plurality of different video asset sources, such as VOD (video on demand), PVR (personal video recorders) and broadcast (including over the air, cable, and satellite). Images from the video assets are displayed in a uniform manner, along with information about the video assets. The information includes data in a metadata category. The view can select one of the video assets for viewing, but also can navigate using metadata categories such as genre, actors, director etc. This allows a much easier and natural navigating and selection process for viewers.

20 Claims, 25 Drawing Sheets

Related U.S. Application Data continuation of application No. 16/554,268, filed on Aug. 28, 2019, now Pat. No. 12,015,829, which is a continuation of application No. 15/212,699, filed on Jul. 18, 2016, now Pat. No. 10,440,437, which is a continuation of application No. 11/081,009, filed on Mar. 15, 2005, now Pat. No. 9,396,212.

(60) Provisional application No. 60/560,146, filed on Apr. 7, 2004.

(51) Int. Cl.

| | | |
|---|---|---|
| *G06F 16/738* | (2019.01) | |
| *G06F 16/74* | (2019.01) | |
| *G06F 16/78* | (2019.01) | |
| *G11B 27/10* | (2006.01) | |
| *G11B 27/34* | (2006.01) | |
| *H04H 60/72* | (2008.01) | |
| *H04H 60/73* | (2008.01) | |
| *H04N 5/775* | (2006.01) | |
| *H04N 7/16* | (2011.01) | |
| *H04N 7/173* | (2011.01) | |
| *H04N 21/2747* | (2011.01) | |
| *H04N 21/4147* | (2011.01) | |
| *H04N 21/431* | (2011.01) | |
| *H04N 21/443* | (2011.01) | |
| *H04N 21/462* | (2011.01) | |
| *H04N 21/472* | (2011.01) | |
| *H04N 21/81* | (2011.01) | |
| *H04N 21/84* | (2011.01) | |
| *H04N 21/8549* | (2011.01) | |

(52) U.S. Cl.
CPC ............ *G06F 16/78* (2019.01); *G11B 27/105* (2013.01); *G11B 27/34* (2013.01); *H04H 60/72* (2013.01); *H04H 60/73* (2013.01); *H04N 5/775* (2013.01); *H04N 7/163* (2013.01); *H04N 7/17318* (2013.01); *H04N 21/2747* (2013.01); *H04N 21/4147* (2013.01); *H04N 21/4312* (2013.01); *H04N 21/4314* (2013.01); *H04N 21/4316* (2013.01); *H04N 21/4438* (2013.01); *H04N 21/4622* (2013.01); *H04N 21/47202* (2013.01); *H04N 21/47214* (2013.01); *H04N 21/8153* (2013.01); *H04N 21/84* (2013.01); *H04N 21/8549* (2013.01)

(58) Field of Classification Search
USPC ...... 707/706, 732; 725/52, 46, 61, 105, 110, 725/25, 127, 91, 34, 112, 9, 36, 32; 709/219
See application file for complete search history.

(56) References Cited

U.S. PATENT DOCUMENTS

| | | |
|---|---|---|
| 4,331,974 A | 5/1982 | Cogswell et al. |
| 4,475,123 A | 10/1984 | Dumbauld et al. |
| 4,573,072 A | 2/1986 | Freeman |
| 4,602,279 A | 7/1986 | Freeman |
| 4,625,235 A | 11/1986 | Watson |
| 4,638,359 A | 1/1987 | Watson |
| 4,703,423 A | 10/1987 | Bado et al. |
| 4,716,410 A | 12/1987 | Nozaki |
| 4,789,235 A | 12/1988 | Borah et al. |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,850,007 A | 7/1989 | Marino et al. |
| 4,918,516 A | 4/1990 | Freeman |
| 5,099,422 A | 3/1992 | Foresman et al. |
| 5,155,591 A | 10/1992 | Wachob |
| 5,173,900 A | 12/1992 | Miller et al. |
| 5,220,501 A | 6/1993 | Lawlor et al. |
| 5,231,494 A | 7/1993 | Wachob |
| RE34,340 E | 8/1993 | Freeman |
| 5,253,940 A | 10/1993 | Abecassis |
| 5,260,778 A | 11/1993 | Kauffman et al. |
| 5,291,395 A | 3/1994 | Abecassis |
| 5,305,195 A | 4/1994 | Murphy |
| 5,343,239 A | 8/1994 | Lappington et al. |
| 5,347,632 A | 9/1994 | Filepp et al. |
| 5,356,151 A | 10/1994 | Abecassis |
| 5,361,393 A | 11/1994 | Rossillo |
| 5,377,354 A | 12/1994 | Scannell et al. |
| 5,414,455 A | 5/1995 | Hooper et al. |
| 5,422,468 A | 6/1995 | Abecassis |
| 5,424,770 A | 6/1995 | Schmelzer et al. |
| 5,426,281 A | 6/1995 | Abecassis |
| 5,434,678 A | 7/1995 | Abecassis |
| 5,442,390 A | 8/1995 | Hooper et al. |
| 5,442,771 A | 8/1995 | Filepp et al. |
| 5,446,919 A | 8/1995 | Wilkins |
| 5,448,568 A | 9/1995 | Delpuch et al. |
| 5,499,046 A | 3/1996 | Schiller et al. |
| 5,515,098 A | 5/1996 | Carles |
| 5,515,270 A | 5/1996 | Weinblatt |
| 5,519,433 A | 5/1996 | Lappington et al. |
| 5,526,035 A | 6/1996 | Lappington et al. |
| 5,528,304 A | 6/1996 | Cherrick et al. |
| 5,537,141 A | 7/1996 | Harper et al. |
| 5,548,532 A | 8/1996 | Menand et al. |
| 5,550,735 A | 8/1996 | Slade et al. |
| 5,559,548 A | 9/1996 | Davis et al. |
| 5,566,353 A | 10/1996 | Cho et al. |
| 5,584,025 A | 12/1996 | Keithley et al. |
| 5,585,838 A | 12/1996 | Lawler et al. |
| 5,585,858 A | 12/1996 | Harper et al. |
| 5,592,551 A | 1/1997 | Lett et al. |
| 5,594,910 A | 1/1997 | Filepp et al. |
| 5,610,653 A | 3/1997 | Abecassis |
| 5,617,142 A | 4/1997 | Hamilton |
| 5,632,007 A | 5/1997 | Freeman |
| 5,634,849 A | 6/1997 | Abecassis |
| 5,635,978 A | 6/1997 | Alten et al. |
| 5,636,346 A | 6/1997 | Saxe |
| 5,638,113 A | 6/1997 | Lappington et al. |
| 5,652,615 A | 7/1997 | Bryant et al. |
| 5,671,225 A | 9/1997 | Hooper et al. |
| 5,682,196 A | 10/1997 | Freeman |
| 5,684,918 A | 11/1997 | Abecassis |
| 5,696,869 A | 12/1997 | Abecassis |
| 5,717,814 A | 2/1998 | Abecassis |
| 5,717,923 A | 2/1998 | Dedrick |
| 5,724,091 A | 3/1998 | Freeman et al. |
| 5,724,472 A | 3/1998 | Abecassis |
| 5,724,521 A | 3/1998 | Dedrick |
| 5,734,413 A | 3/1998 | Lappington et al. |
| 5,740,388 A | 4/1998 | Hunt |
| 5,740,549 A | 4/1998 | Reilly et al. |
| 5,754,939 A | 5/1998 | Herz et al. |
| 5,758,259 A | 5/1998 | Lawler |
| 5,761,601 A | 6/1998 | Nemirofsky et al. |
| 5,764,275 A | 6/1998 | Lappington et al. |
| 5,768,521 A | 6/1998 | Dedrick |
| 5,774,170 A | 6/1998 | Hite et al. |
| 5,774,664 A | 6/1998 | Hidary et al. |
| 5,778,181 A | 7/1998 | Hidary et al. |
| 5,784,095 A | 7/1998 | Robbins et al. |
| 5,784,528 A | 7/1998 | Yamane et al. |
| 5,786,521 A | 7/1998 | Darsow et al. |
| 5,796,945 A | 8/1998 | Tarabella |
| 5,802,314 A | 9/1998 | Tullis et al. |
| 5,805,974 A | 9/1998 | Hite et al. |
| 5,825,884 A | 10/1998 | Zdepski et al. |
| 5,828,809 A | 10/1998 | Chang et al. |
| 5,835,087 A | 11/1998 | Herz et al. |
| 5,861,881 A | 1/1999 | Freeman et al. |

(56) References Cited

U.S. PATENT DOCUMENTS

| | | |
|---|---|---|
| 5,867,208 A | 2/1999 | McLaren |
| 5,873,068 A | 2/1999 | Beaumont et al. |
| 5,887,243 A | 3/1999 | Harvey et al. |
| 5,889,506 A | 3/1999 | Lopresti et al. |
| 5,903,263 A | 5/1999 | Emura |
| 5,907,837 A | 5/1999 | Ferrel et al. |
| 5,913,031 A | 6/1999 | Blanchard |
| 5,917,830 A | 6/1999 | Chen et al. |
| 5,929,850 A | 7/1999 | Broadwin et al. |
| 5,931,901 A | 8/1999 | Wolfe et al. |
| 5,937,331 A | 8/1999 | Kalluri et al. |
| 5,949,407 A | 9/1999 | Sato |
| 5,978,799 A | 11/1999 | Hirsch |
| 5,986,692 A | 11/1999 | Logan et al. |
| 5,990,883 A | 11/1999 | Byrne et al. |
| 5,991,735 A | 11/1999 | Gerace |
| 6,002,393 A | 12/1999 | Hite et al. |
| 6,018,768 A | 1/2000 | Ullman et al. |
| 6,020,883 A | 2/2000 | Herz et al. |
| 6,026,368 A | 2/2000 | Brown et al. |
| 6,029,045 A | 2/2000 | Picco et al. |
| 6,038,000 A | 3/2000 | Hurst |
| 6,038,367 A | 3/2000 | Abecassis |
| 6,049,569 A | 4/2000 | Radha et al. |
| 6,067,348 A | 5/2000 | Hibbeler |
| 6,075,551 A | 6/2000 | Berezowski et al. |
| 6,104,334 A | 8/2000 | Allport |
| 6,107,992 A | 8/2000 | Ishigaki |
| 6,108,486 A | 8/2000 | Sawabe et al. |
| 6,118,442 A | 9/2000 | Tanigawa |
| 6,128,655 A | 10/2000 | Fields et al. |
| 6,137,834 A | 10/2000 | Wine et al. |
| 6,141,358 A | 10/2000 | Hurst et al. |
| 6,160,570 A | 12/2000 | Sitnik |
| 6,219,839 B1 | 4/2001 | Sampsell |
| 6,304,852 B1 | 10/2001 | Loncteaux |
| 6,314,571 B1 | 11/2001 | Ogawa et al. |
| 6,327,574 B1 | 12/2001 | Kramer et al. |
| 6,330,286 B1 | 12/2001 | Lyons et al. |
| 6,343,287 B1 | 1/2002 | Kumar et al. |
| 6,357,042 B2 | 3/2002 | Srinivasan et al. |
| 6,360,234 B2 | 3/2002 | Jain et al. |
| 6,361,326 B1 | 3/2002 | Fontana et al. |
| 6,408,278 B1 | 6/2002 | Carney et al. |
| 6,411,992 B1 | 6/2002 | Srinivasan et al. |
| 6,421,067 B1 | 7/2002 | Kamen et al. |
| 6,424,991 B1 | 7/2002 | Gish |
| 6,445,306 B1 | 9/2002 | Trovato et al. |
| 6,449,657 B2 | 9/2002 | Stanbach et al. |
| 6,457,010 B1 | 9/2002 | Eldering et al. |
| 6,463,444 B1 | 10/2002 | Jain et al. |
| 6,463,585 B1 | 10/2002 | Hendricks et al. |
| 6,466,975 B1 | 10/2002 | Sterling |
| 6,469,633 B1 | 10/2002 | Wachter |
| 6,496,856 B1 | 12/2002 | Kenner et al. |
| 6,502,076 B1 | 12/2002 | Smith |
| 6,567,980 B1 | 5/2003 | Jain et al. |
| 6,574,793 B1 | 6/2003 | Ngo et al. |
| 6,588,013 B1 | 7/2003 | Lumley et al. |
| 6,601,237 B1 | 7/2003 | Ten et al. |
| 6,611,624 B1 | 8/2003 | Zhang et al. |
| 6,671,880 B2 | 12/2003 | Shah-Nazaroff et al. |
| 6,678,332 B1 | 1/2004 | Gardere et al. |
| 6,681,395 B1 | 1/2004 | Nishi |
| 6,694,482 B1 | 2/2004 | Arellano et al. |
| 6,698,020 B1 | 2/2004 | Zigmond et al. |
| 6,714,909 B1 | 3/2004 | Gibbon et al. |
| 6,735,628 B2 | 5/2004 | Eyal |
| 6,765,557 B1 | 7/2004 | Segal et al. |
| 6,769,127 B1 | 7/2004 | Bonomi et al. |
| 6,785,289 B1 | 8/2004 | Ward et al. |
| 6,806,909 B1 | 10/2004 | Radha et al. |
| 6,850,252 B1 | 2/2005 | Hoffberg |
| 6,857,024 B1 | 2/2005 | Chen et al. |
| 6,877,134 B1 | 4/2005 | Fuller et al. |
| 6,882,793 B1 | 4/2005 | Fu et al. |
| 6,934,917 B2 | 8/2005 | Lin |
| 7,152,207 B1 | 12/2006 | Underwood et al. |
| 7,168,084 B1 | 1/2007 | Hendricks et al. |
| 7,188,356 B1 | 3/2007 | Miura et al. |
| 7,207,053 B1 | 4/2007 | Asmussen |
| 7,222,163 B1 | 5/2007 | Girouard et al. |
| 7,248,778 B1 | 7/2007 | Anderson et al. |
| 7,257,604 B1 | 8/2007 | Wolfe |
| 7,260,564 B1 | 8/2007 | Lynn et al. |
| 7,277,928 B2 | 10/2007 | Lennon |
| 7,404,200 B1 | 7/2008 | Hailey et al. |
| 7,581,182 B1 | 8/2009 | Herz |
| 7,610,555 B2 | 10/2009 | Klein et al. |
| 7,630,986 B1 | 12/2009 | Herz et al. |
| 7,734,251 B1 * | 6/2010 | Harvey ............... G01R 1/071 |
| 7,779,429 B2 | 8/2010 | Neil et al. |
| 7,779,439 B2 | 8/2010 | Sie et al. |
| 7,873,972 B2 | 1/2011 | Zaslavsky et al. |
| 7,895,624 B1 | 2/2011 | Thomas et al. |
| 7,987,491 B2 | 7/2011 | Reisman |
| 8,245,259 B2 | 8/2012 | McCoskey et al. |
| 8,250,051 B2 | 8/2012 | Bugir et al. |
| 8,250,251 B2 | 8/2012 | Malalur |
| 8,418,203 B1 | 4/2013 | Nishio et al. |
| 9,087,126 B2 | 7/2015 | Haberman |
| 9,396,212 B2 | 7/2016 | Haberman |
| 9,445,133 B2 | 9/2016 | Mock |
| 10,404,437 B2 | 9/2019 | Astely et al. |
| 2001/0013124 A1 | 8/2001 | Klosterman et al. |
| 2001/0018693 A1 | 8/2001 | Jain et al. |
| 2001/0037465 A1 | 11/2001 | Hart et al. |
| 2001/0056577 A1 | 12/2001 | Gordon et al. |
| 2002/0026359 A1 | 2/2002 | Long et al. |
| 2002/0038299 A1 | 3/2002 | Zernik et al. |
| 2002/0054020 A1 | 5/2002 | Perkes |
| 2002/0056093 A1 | 5/2002 | Kunkel et al. |
| 2002/0056119 A1 | 5/2002 | Moynihan |
| 2002/0057297 A1 * | 5/2002 | Grimes ............... H04N 21/4312 715/810 |
| 2002/0057336 A1 | 5/2002 | Gaul et al. |
| 2002/0059610 A1 | 5/2002 | Ellis |
| 2002/0067376 A1 | 6/2002 | Martin et al. |
| 2002/0083443 A1 | 6/2002 | Eldering et al. |
| 2002/0092017 A1 | 7/2002 | Klosterman et al. |
| 2002/0092019 A1 * | 7/2002 | Marcus ............... H04N 21/4532 348/E7.071 |
| 2002/0093529 A1 * | 7/2002 | Daoud ................ G06F 16/9538 715/745 |
| 2002/0095676 A1 | 7/2002 | Knee et al. |
| 2002/0124256 A1 | 9/2002 | Suzuka |
| 2002/0175930 A1 | 11/2002 | Kolde et al. |
| 2002/0188948 A1 | 12/2002 | Florence |
| 2003/0001880 A1 | 1/2003 | Holtz et al. |
| 2003/0009773 A1 | 1/2003 | Carlson |
| 2003/0011718 A1 | 1/2003 | Clapper |
| 2003/0018755 A1 | 1/2003 | Masterson et al. |
| 2003/0028889 A1 * | 2/2003 | McCoskey ........... G06F 16/248 348/E7.071 |
| 2003/0028896 A1 | 2/2003 | Swart et al. |
| 2003/0030752 A1 | 2/2003 | Begeja et al. |
| 2003/0033174 A1 | 2/2003 | Ikeda et al. |
| 2003/0070175 A1 | 4/2003 | Panabaker |
| 2003/0088687 A1 | 5/2003 | Begeja et al. |
| 2003/0088872 A1 | 5/2003 | Maissel et al. |
| 2003/0093790 A1 | 5/2003 | Logan et al. |
| 2003/0093792 A1 | 5/2003 | Labeeb et al. |
| 2003/0101451 A1 | 5/2003 | Bentolila et al. |
| 2003/0110181 A1 | 6/2003 | Schuetze et al. |
| 2003/0110500 A1 | 6/2003 | Rodriguez |
| 2003/0110503 A1 | 6/2003 | Perkes |
| 2003/0120748 A1 | 6/2003 | Begeja et al. |
| 2003/0121055 A1 | 6/2003 | Kaminski et al. |
| 2003/0126600 A1 | 7/2003 | Heuvelman |
| 2003/0126605 A1 | 7/2003 | Betz et al. |
| 2003/0149975 A1 | 8/2003 | Eldering et al. |
| 2003/0167471 A1 | 9/2003 | Roth et al. |
| 2003/0172374 A1 | 9/2003 | Vinson et al. |
| 2003/0177503 A1 | 9/2003 | Sull et al. |

(56) References Cited

U.S. PATENT DOCUMENTS

| | | |
|---|---|---|
| 2003/0195863 A1 | 10/2003 | Marsh |
| 2003/0206710 A1* | 11/2003 | Ferman ................ H04N 21/466 |
| | | 348/E7.069 |
| 2003/0229900 A1 | 12/2003 | Reisman |
| 2003/0237093 A1 | 12/2003 | Marsh |
| 2004/0003403 A1 | 1/2004 | Marsh |
| 2004/0025180 A1 | 2/2004 | Begeja et al. |
| 2004/0031058 A1 | 2/2004 | Reisman |
| 2004/0041723 A1 | 3/2004 | Shibamiya et al. |
| 2004/0066397 A1 | 4/2004 | Walker et al. |
| 2004/0078807 A1 | 4/2004 | Fries et al. |
| 2004/0095317 A1 | 5/2004 | Zhang et al. |
| 2004/0097606 A1 | 5/2004 | Lee et al. |
| 2004/0098743 A1 | 5/2004 | Gutta et al. |
| 2004/0111465 A1 | 6/2004 | Chuang et al. |
| 2004/0111742 A1 | 6/2004 | Hendricks et al. |
| 2004/0117831 A1 | 6/2004 | Ellis et al. |
| 2004/0136698 A1 | 7/2004 | Mock |
| 2004/0152054 A1 | 8/2004 | Gleissner et al. |
| 2004/0158876 A1 | 8/2004 | Lee |
| 2004/0168187 A1 | 8/2004 | Chang |
| 2004/0199657 A1 | 10/2004 | Eyal et al. |
| 2004/0220926 A1 | 11/2004 | Lamkin et al. |
| 2004/0226051 A1 | 11/2004 | Carney et al. |
| 2004/0252119 A1 | 12/2004 | Hunleth et al. |
| 2004/0252120 A1 | 12/2004 | Hunleth et al. |
| 2004/0252193 A1 | 12/2004 | Higgins |
| 2004/0268386 A1 | 12/2004 | Logan et al. |
| 2004/0268393 A1 | 12/2004 | Hunleth et al. |
| 2005/0005288 A1 | 1/2005 | Novak |
| 2005/0010950 A1 | 1/2005 | Carney et al. |
| 2005/0010953 A1 | 1/2005 | Carney et al. |
| 2005/0050218 A1 | 3/2005 | Sheldon |
| 2005/0062695 A1* | 3/2005 | Cok ........................ G09G 5/36 |
| | | 345/82 |
| 2005/0062888 A1 | 3/2005 | Wood et al. |
| 2005/0086689 A1 | 4/2005 | Dudkiewicz et al. |
| 2005/0086691 A1 | 4/2005 | Dudkiewicz et al. |
| 2005/0086692 A1 | 4/2005 | Dudkiewicz et al. |
| 2005/0097470 A1 | 5/2005 | Dias et al. |
| 2005/0097606 A1* | 5/2005 | Scott, III ............... H04N 21/47 |
| | | 725/52 |
| 2005/0166224 A1 | 7/2005 | Ficco |
| 2005/0193425 A1 | 9/2005 | Sull et al. |
| 2005/0252193 A1 | 11/2005 | Iya et al. |
| 2005/0253808 A1 | 11/2005 | Yoshida |
| 2006/0061595 A1 | 3/2006 | Goede et al. |
| 2006/0067618 A1 | 3/2006 | Hill |
| 2007/0133937 A1 | 6/2007 | Nakamura et al. |
| 2007/0282818 A1 | 12/2007 | Thoms et al. |
| 2008/0115169 A1 | 5/2008 | Ellis et al. |
| 2010/0031193 A1 | 2/2010 | Stark et al. |
| 2011/0126246 A1 | 5/2011 | Thomas et al. |
| 2013/0024906 A9 | 1/2013 | Carney et al. |
| 2013/0219419 A1 | 8/2013 | Silver et al. |

FOREIGN PATENT DOCUMENTS

| | | |
|---|---|---|
| JP | 11164276 | 6/1999 |
| JP | 11261908 | 9/1999 |
| JP | 2000341598 A | 12/2000 |
| JP | 2002014964 A | 1/2002 |
| JP | 2002157269 A | 5/2002 |
| JP | 2002204406 A | 7/2002 |
| JP | 2003006100 A | 1/2003 |
| JP | 2003061000 A | 2/2003 |
| JP | 2003069912 A | 3/2003 |
| JP | 2003153099 A | 5/2003 |
| JP | 2003530782 A | 10/2003 |
| JP | 2003534737 A | 11/2003 |
| JP | 2007515768 A | 6/2007 |
| WO | 0011869 | 3/2000 |
| WO | 01/78382 | 10/2001 |
| WO | 2003024108 | 3/2003 |
| WO | 2004003790 | 1/2004 |
| WO | 2004064296 | 7/2004 |
| WO | 2004084296 | 9/2004 |
| WO | 2005031467 | 4/2005 |

OTHER PUBLICATIONS

Farag W E et al: "A human-based technique for measuring video data similarity" Computers and Communication, 2003. (ISCC 2003). Proceedings. Eighth IEEE International Symposium On Jun. 30-Jul. 3, 203, Piscataway, NJ, USA, IEEE, 2003, pp. 769-774.

International Search Report and written Opinion for International Patent Application No. PCT/US2007/013124 mailed Dec. 7, 2007.

International Search Report and Written Opinion of International Application No. PCT/US07/17433 mailed Feb. 27, 2008.

International Search Report and Written Opinion of PCT/US05/11515 published May 24, 2007.

International Search Report and Written Opinion of PCT/US2005/11590 published Apr. 24, 2007.

Smeaton, A.F.: "Indexing, Browsing and Searching of Digital Video" ARIST—Annual Review of Information Science and Technology, Chapter 8, [Online] vol. 38, Oct. 2003 (Oct. 2003), pp. 371-407.

Stark. Korina, et al., Provisional Application Apr. 30, 2004., U.S. Appl. No. 60/567,177.

Supplementary European Search Report for European Application No. 05733091 mailed Mar. 11, 2008.

Supplementary European Search Report For European Patent Application No. 05733846, mailed Dec. 9, 2007.

U.S. Appl. No. 16/554,268, filed Aug. 28, 2019, Seth Haberman.

* cited by examiner

SYSTEM AND METHOD FOR ENHANCED VIDEO SELECTION

CROSS-REFERENCE TO RELATED APPLICATIONS

This application is a continuation of U.S. patent application Ser. No. 17/138,192, filed Dec. 30, 2020, which is a continuation of U.S. patent application Ser. No. 16/554,268, filed Aug. 28, 2019, which is a continuation of U.S. patent application Ser. No. 15/212,699 (now U.S. Pat. No. 10,440,437), filed Jul. 18, 2016, which is a continuation of U.S. patent application Ser. No. 11/081,009 (now U.S. Pat. No. 9,396,212), filed Mar. 15, 2005, which claims the benefit of U.S. Provisional Application No. 60/560,146 filed Apr. 7, 2004. The disclosures of each application are hereby incorporated by reference herein in their entireties.

FIELD OF THE INVENTION

This invention is directed towards multi-channel video environments, and more particularly towards a system for navigating through video assets are broadcasted, available on a server for play out.

BACKGROUND

With the introduction of multi-channel video, Electronic Program Guides (EPGs) were developed to assist the consumer with navigating the '500 Channel' universe. These allowed features such as grouping of similarly themed programming, look ahead (and often marking for recording), navigating by Favorite Channels, etc. EPGs typically give access to currently showing, and shortly upcoming linear television programming.

With the rise of Video-On-Demand (VOD), EPGs have needed to toggle between VOD offerings and linear offerings. These have been somewhat of a compromise because prerecorded material offered through a VOD service cannot be selected directly through the EPG listings for linear channels. In addition to this, the VOD selection mechanisms are often modeled as hierarchical menu selection structures, and with the steady increase of content available through VOD servers, this makes it increasingly difficult for consumers to navigate all available content.

Personal Video Recorders (PVRs) have had a similar effect: programming available on PVR is typically presented separate from the linear programming and even from the programming available on VOD, so in order to browse all available programming consumers effectively "toggle" between linear programming, VOD programming, and PVR programming.

Accordingly, there is a need to be able to tie these technologies together to enable the consumer to browse and search available programming content using metadata values in a consistent manner, and to represent the metadata in an intuitive way so that it is easy to relate them to the programming content. The invention is meant as an extension to current EPG capabilities, to make it easier to find relevant content.

SUMMARY

Advantageously, technologies have been developed to enable topically linked searches across multiple databases, meta data descriptors have been developed to more fully capture characteristics of such content as well as sub-sections of such content, and technologies have been developed where video scenes can have part of the screen with hot links to meta data objects.

An illustrative embodiment of the present invention include a system for gathering video asset information for a user to assist the user in selecting a video asset for viewing, wherein the video assets are available from a plurality of different video asset sources. It includes a metadata component, to store data regarding the video assets available from the plurality of different video asset sources, the data grouped into at least one metadata category. Examples of metadata categories include actor, director, genre, sport, league, team, player, or school. At least some of the data is presented to the user to allow the user to select and view video assets irrespective of the video asset source. The system also includes a clip/still component to obtain and store at least one image associated with each video asset available from the plurality of different video asset sources. This image or images are displayed to the user along with the data. The system can also include an asset availability component to determine available video assets from said plurality of video asset sources. The user may select which video asset sources are available for video assets. This system can be ancillary to a first system assisting the user in selecting a video asset on a particular video asset source.

The illustrative embodiment also includes a feature where when some data is presented to the user, the user may request a search for other video assets available from the plurality of different video asset sources which have associated data that substantially matches the presented at least some data, in the metadata category. This allows the user to easily navigate through video assets. The user may select other video asset sources while requesting the search for other video assets based on the presented at least some data.

Examples of video asset sources include VOD, PVR, or contemporaneous or future broadcast video. The system also handles details for dealing with video assets from different sources, for example if the user selects for viewing a video asset from a future broadcast video source, the system provides the user with an option of setting an alert to remind the viewer at a time proximate when the video asset can be viewed. Further the system can alert the user if a selected video asset for viewing requires a format conversion in order to be viewed. Also, if a same video asset is available from a plurality of video asset sources, the system includes a selection setting to determine from which video asset source the same video asset will be made available for viewing.

An embodiment of the present invention includes a method for gathering video asset information to assist a user in selecting a video asset for viewing, wherein the video assets are available from a plurality of different video asset sources. It includes obtaining data regarding the video assets available from the plurality of different video asset sources, wherein the data is grouped into at least one metadata category; and presenting at least some of the data to the user to allow the user to select and view video assets irrespective of the video asset source. It also includes obtaining at least one image associated with each video asset available from the plurality of different video asset sources, and presenting the at least one image in conjunction with the data to the user.

BRIEF DESCRIPTION OF THE DRAWINGS

These and other features of the present invention will be better understood in view of the following detailed description taken in conjunction with the drawings, in which.

DETAILED DESCRIPTION

Figure 1:
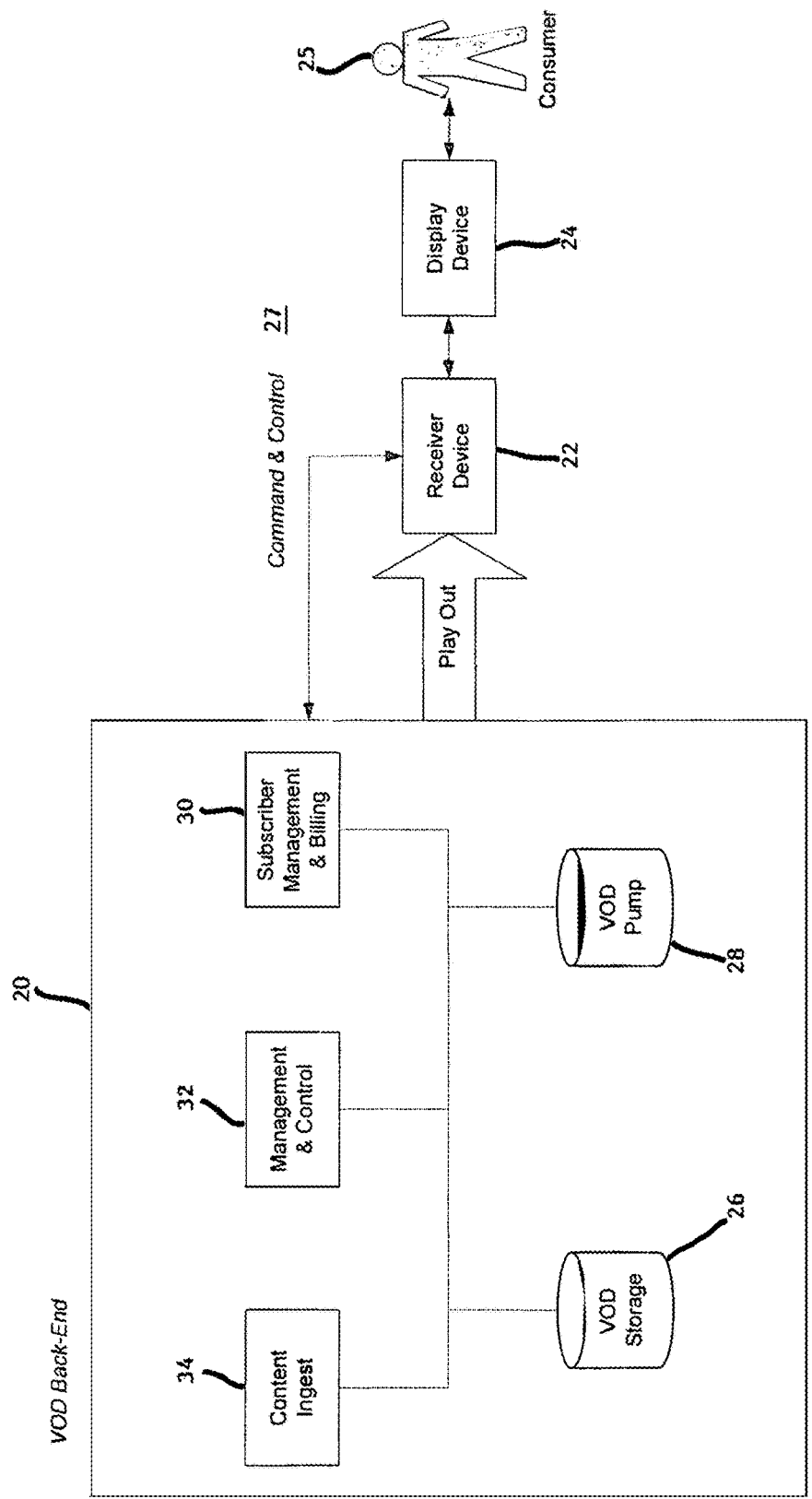
FIG. 1 is a block diagram illustrating components of a typical VOD system.

A schematic overview of a prior art VOD system is shown in FIG. 1. The system consists of a VOD Back-End component 20 (residing in a cable head-end) and a Receiver Device 22 and Display Device 24 at the consumer's home. The Receiver Device 22 may be a digital set-top box, or any other receiving device including computers or media processors. The Display Device 24 can be a TV set, or any other display or monitoring system. Further, the Receiver device 22 and Display Device 24 may also be combined into one physical device, e.g. a "Digital Cable Ready" TV set, or computer/media center. The backend component 20 may comprise several modules, such as one or more VOD Storage servers 26 (used to store the programming that is available to the consumers), one or more VOD Pumps 28 (used to play out the programming as requested by the various consumers that are actually using the system at any point in time), a Subscriber Management & Billing module 30 (used to interface with the subscriber database, and for authentication and billing services), a Management & Control module 32 (used to overall manage the system, assets, and resources), and a Content Ingest module 34 (used to load new programming content onto the system).

Figure 2:
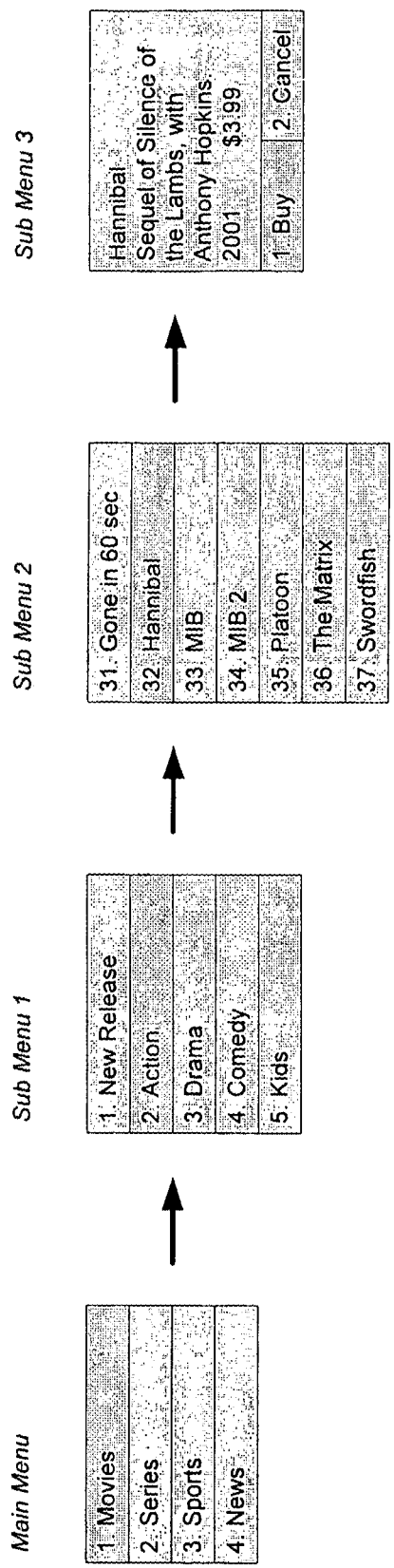
FIG. 2 illustrates a typical set of traversal steps through a VOD menu system to select a movie for viewing.

In typical usage scenario, the consumer 25 would "toggle" to VOD (e.g. by pressing a special button on their Received Device remote control. This causes the Receiver Device to send an initiation signal to the VOD Back-End over the Command & Control channel, and then typically tune to a VOD channel, which gives the consumer a menu of available VOD assets from which to select. This menu is typically implemented as a hierarchical text-oriented menu system, where the user can select sub-menus and order VOD assets with key presses from their remote control. This is illustrated in the menu chain 36 of FIG. 2, where the consumer selects "Movies" from the main menu, then selects "Action Movies" from Sub Menu 1, then selects "Hannibal" from Sub Menu 2, then confirms the transaction to buy Hannibal at Sub Menu 3. Once all this is done, the VOD Back-End system 20 will allocate Hannibal in the VOD Storage system 26, allocate an available VOD Pump 28, and instruct the VOD Pump 28 to start playing out Hannibal on an available bandwidth slot (frequency) in the network. The Receiver Device 22 will then tune itself to this slot, and starts displaying the asset on the Display Device 24 so that the consumer 25 will begin viewing the asset. During the viewing process the consumer 25 typically has the ability to Pause, Rewind, Fast-Forward the movie by pressing buttons on their remote control. For example when the consumer 25 presses the Pause button, the Receiver Device will send a Pause message (via Command & Control channel 27) to the VOD Back-End 20 to pause the movie. A VOD session can end because the movie viewing has ended, or because the consumer 25 decided to terminate the session by pressing one or more special buttons on the remote control, in both cases the system will go back to regular television viewing mode.

Current interfaces and systems for searching and browsing VOD assets are often problematic and not always effective. The systems are often implemented as hierarchical menu systems, are not very flexible, and not very intuitive. As a result it is not always possible for a consumer to find a VOD asset for viewing, unless they know the exact title and properties of the asset they are looking for. This problem gets even worse if the number of available VOD assets on VOD systems increases.

The present invention provides a new paradigm for browsing and searching video assets available on VOD and from other sources. The present invention takes advantage of metadata for the assets (e.g. "lead actor", "director", "year of release", etc.), and in one embodiment uses it to let the consumer search for certain assets (e.g. "find all assets starring or associated with Clint Eastwood"). It also provides powerful associative search capabilities (e.g. "I like movie X, so find me all assets that have the same lead actor"). Also, the present invention presents the consumer with an intuitive user interface (pictures instead of text) that can be easily navigated with traditional remote controls (no need for keyboards).

Further features of the present invention are described in co-pending U.S. patent application Ser. No. 11/080,389 filed on Mar. 15, 2005 and entitled METHOD AND SYSTEM FOR DISPLAY GUIDE FOR VIDEO SELECTION, which is incorporated herein by reference.

An illustrative implementation of the present invention in a digital cable system will now be described, first in terms of functionality to the consumer, then in terms of implementation in a cable system or environment.

Figure 3:
FIG. 3 illustrates video viewing screen for an illustrative embodiment of the present invention.
Figure 4:
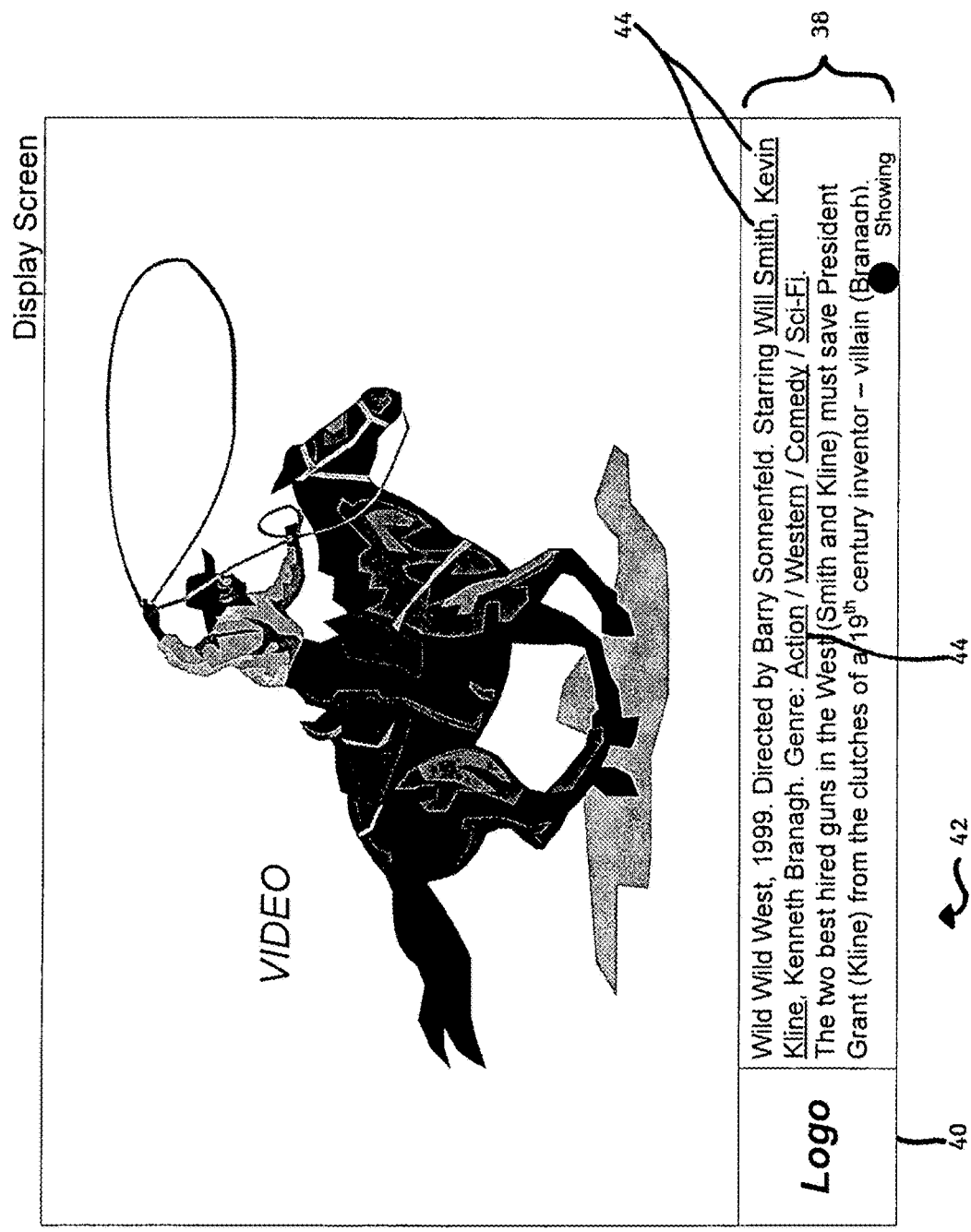
FIG. 4 illustrates interactive information banner for an illustrative embodiment.

Consider a consumer in a digital cable system, who has access to VOD service, and also has a digital receiver device that includes PVR (personal video recorder) service. To start off with, the consumer will be watching a movie, so his display may show full screen video as depicted in FIG. 3. At any point in time during the movie, the consumer can initiate (by pressing a specific button on his remote control) an interactive information banner 38 to be displayed on his display, as illustrated in FIG. 4. In this example the banner 38 contains the channel logo 40 on the left, and some textual description 42 of the current movie to the right. The description contains a number of "linked fields" 44, which are marked by some visual effect (in this example they are underlined). The fields 44 represent associative searches for assets with the same attribute (so the "Will Smith" field represents all assets that feature Will Smith as an actor).

Figure 5:
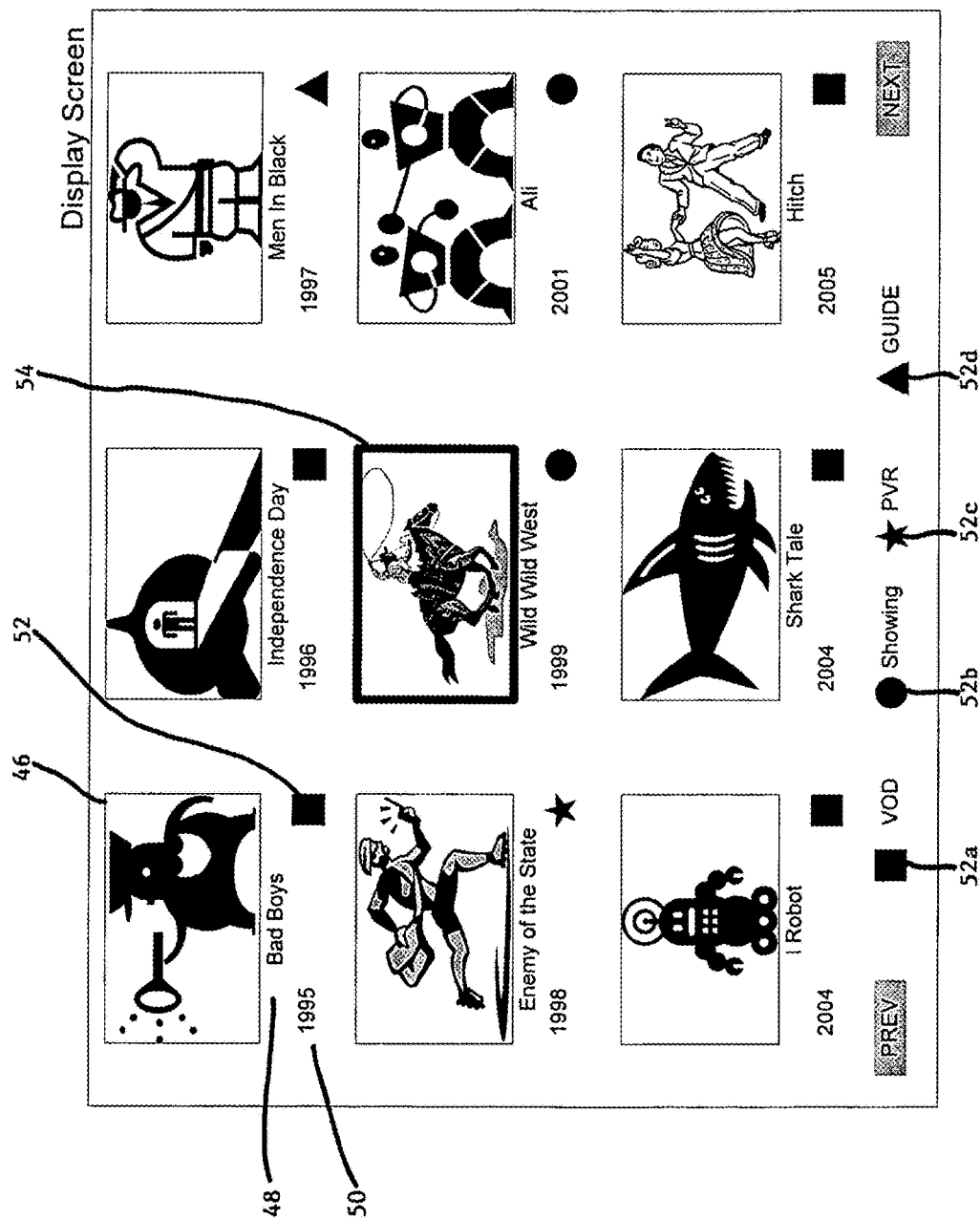
FIG. 5 illustrates a metadata browsing screen for the illustrative embodiment.

The consumer can navigate between the linked field with buttons on the remote control (current selection may be indicated by highlighting it), and then activate one of the links by pressing yet another button on the remote control. For this example, assume the consumer activates the "Will Smith" field. This will lead into a metadata browsing screen (in this case for "Will Smith") as illustrated in FIG. 5. This screen provides the results of a search for all assets that share the same metadata (in this case "Starring Will Smith"). In this example the screen holds nine assets, and each asset is shown as a combination of a still picture 46 (clipped from the asset or from an alternate source) and the title 48 of the asset along with other information such as the release year 50 of the asset and a symbol 52 indicating where the asset is available. Possible values for this symbol are: VOD (available in the VOD archive) 52a, Showing (currently showing) 52b, PVR (available on PVR) 52c, and Guide (shows up in the Guide, so available in the future) 52d. Other possible values for this symbol 52, as well as alternative sources of the assets, such as DVD jukeboxes, tape jukeboxes, and media delivered by IP networks (including Ethernet, fiber, carrier current, wireless, etc.), are also within the scope of the invention.

Figure 6:
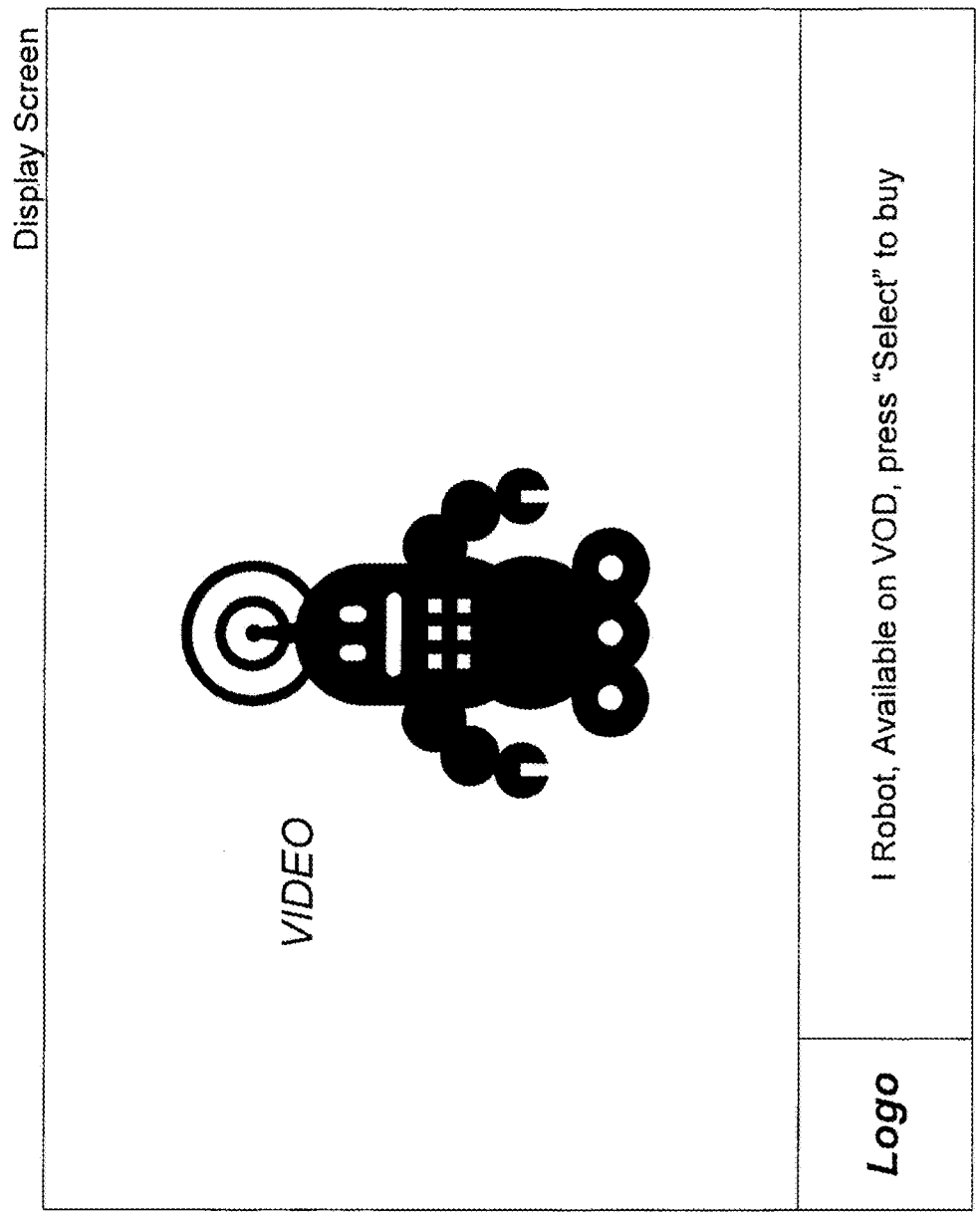
FIG. 6 illustrates a preview/trailer screen for the illustrative embodiment.
Figure 7:
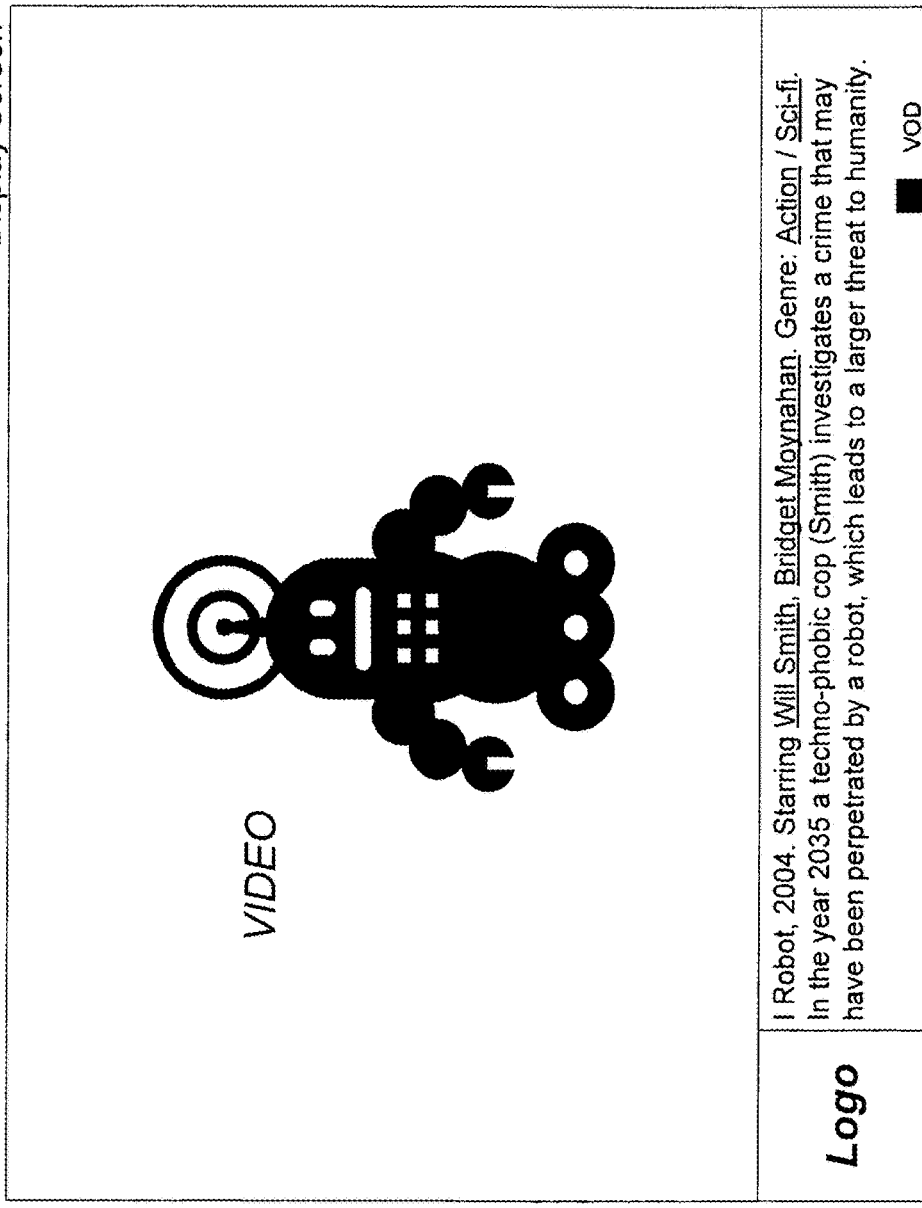
FIG. 7 illustrates a second interactive information banner for an illustrative embodiment.

Typically, one of the assets is highlighted 54 (indicating current selection, in this case the "Wild Wild West" asset). Other methods of drawing attention to the presently selected asset (including but not limited to blinking, ghosting, color changes, alternate borders, etc.) are within the scope of the present invention. The consumer can change current selection using keys on the remote control. In case there are more assets than fit on the screen, the consumer can move to previous and next pages using remote control buttons. The consumer can activate the currently selected asset by pressing a specific button on the remote control. This will take the consumer to a preview/trailer session for the selected asset. For this example, assume the consumer has selected "I Robot", the resulting preview/trailer screen is illustrated in FIG. 6. The preview can be any length theatrical preview, during the preview the consumer has the ability to purchase for viewing the VOD asset by pressing a button on the remote control (in this case the "Select" button). The consumer also has the option of viewing the purchased asset immediately, or potentially selecting a later time to view the VOD asset, allowing for example a parent to make a purchase with password protected purchase option, for the children to view later in the evening. Further, if the VOD asset may be downloaded to a PVR, thereby allowing the consumer to then view the asset from the PVR. The consumer may also pause, fast forward, rewind the contents of the preview. Also, the consumer may press the remote control button for the interactive information banner, which will result in the interactive banner 42 as illustrated in FIG. 7. As discussed before, the consumer may now navigate the links in the banner, etc.

Figure 8:
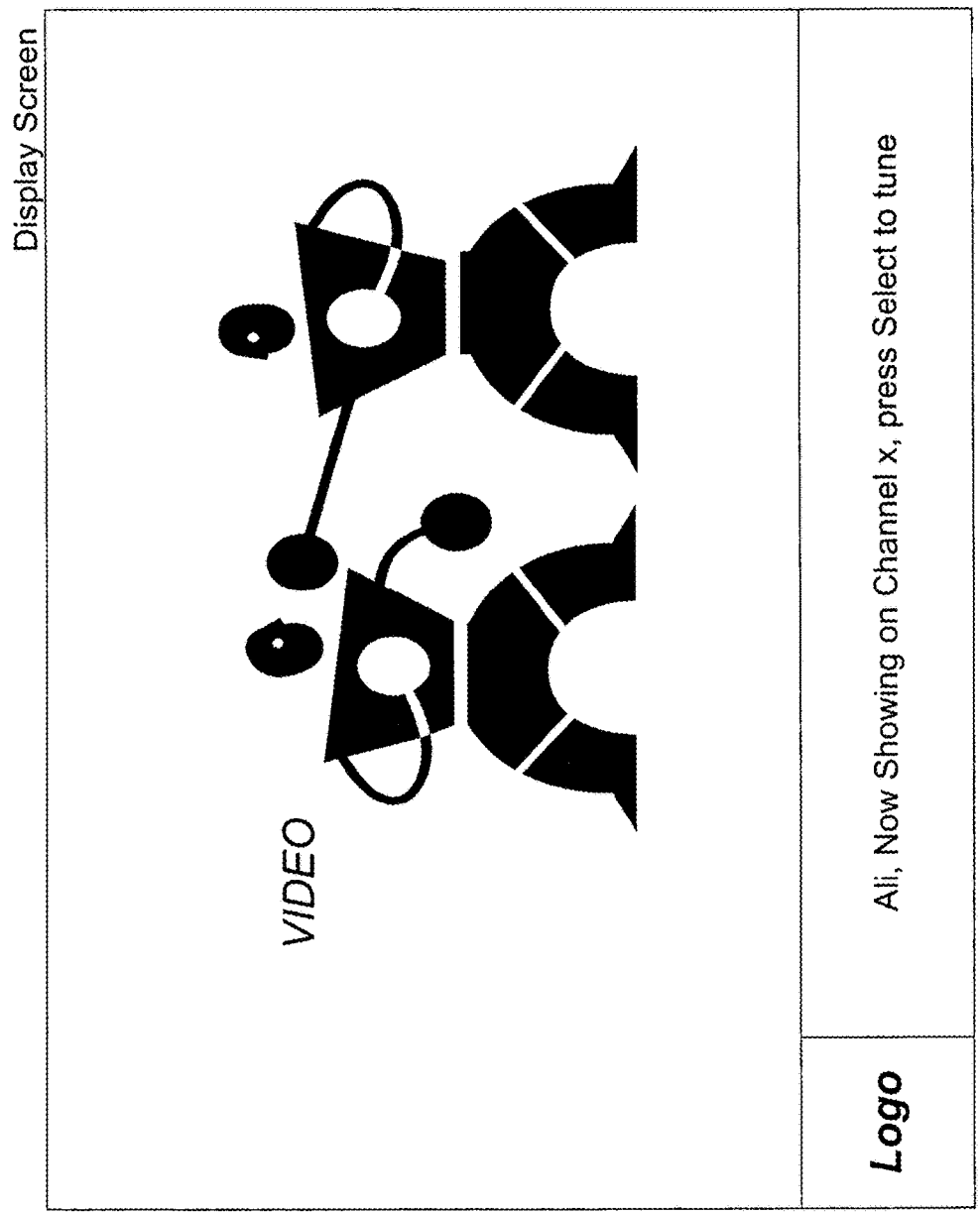
FIG. 8 illustrates a second preview/trailer screen for the illustrative embodiment.
Figure 9:
FIG. 9 illustrates a third preview/trailer screen for the illustrative embodiment.
Figure 10:
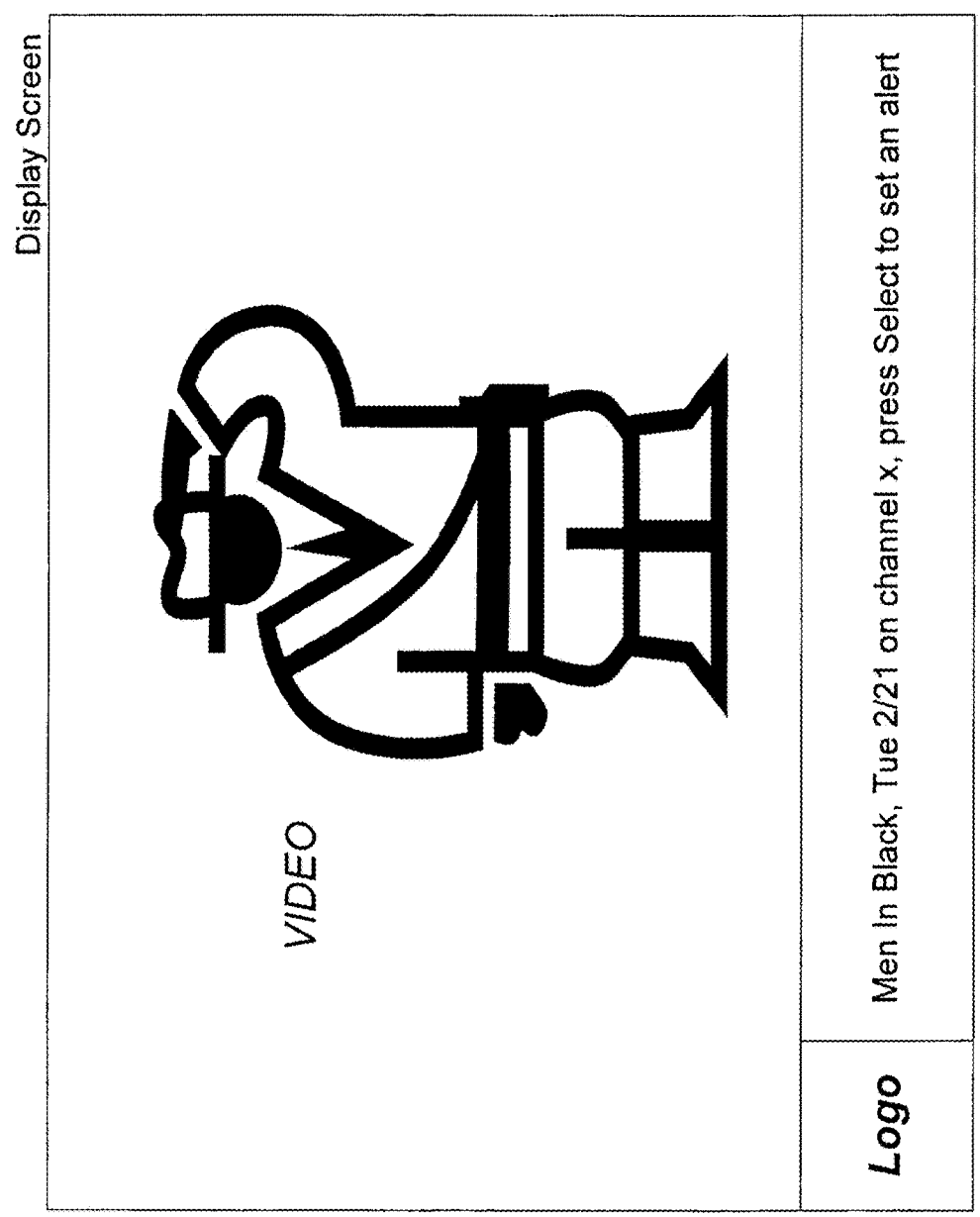
FIG. 10 illustrates a fourth preview/trailer screen for the illustrative embodiment.
Figure 11:
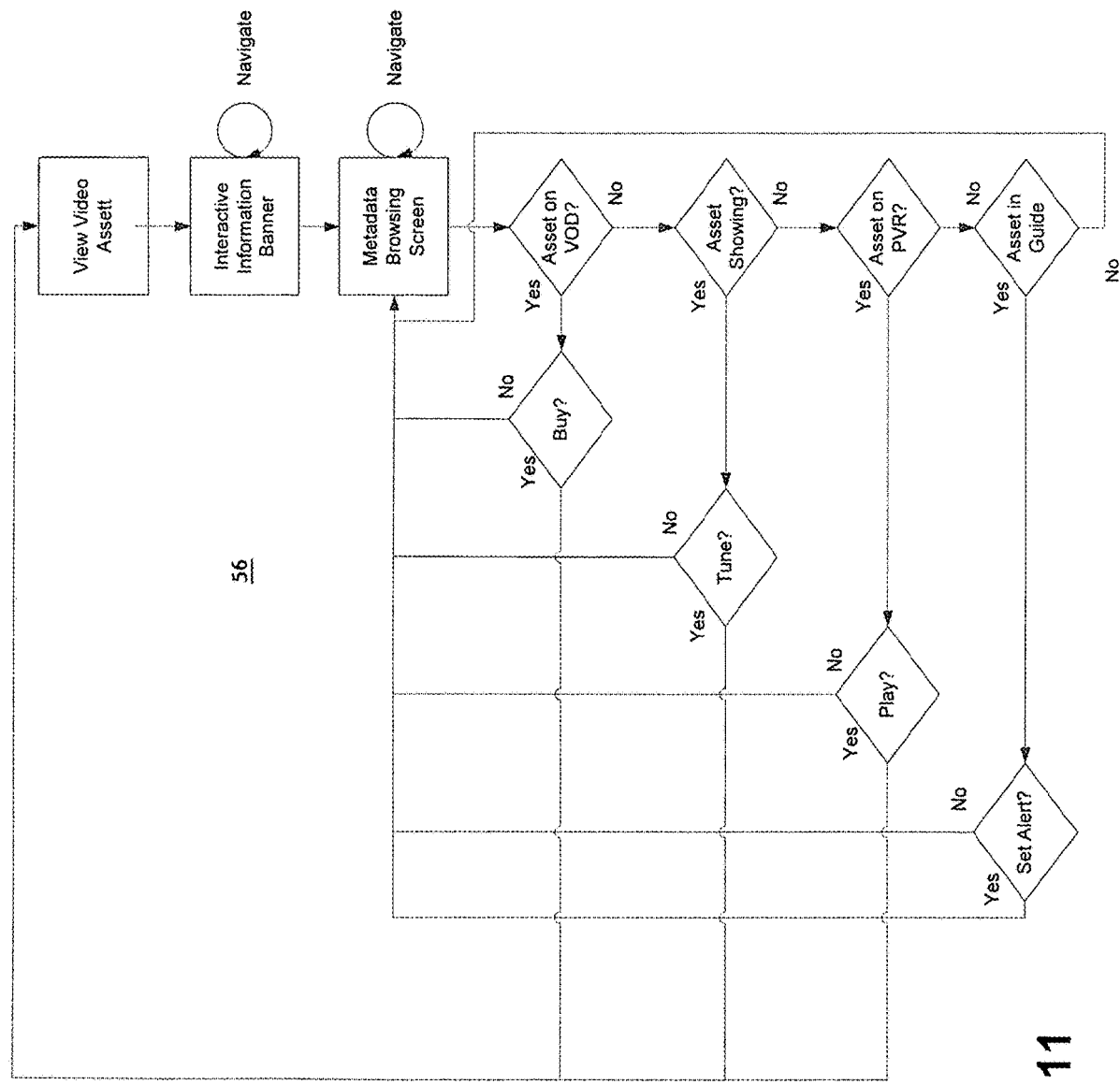
FIG. 11 illustrates a flow chart according to an illustrative embodiment.

The preview/trailer may look slightly different for assets that are available through other means than VOD. FIG. 8 shows the preview screen when a currently showing asset is selected (in this example Ali), FIG. 9 shows the preview screen when an asset is selected that is available on PVR (in this example Enemy of the State), FIG. 10 shows the preview screen when an asset is selected that is available in the Guide (in this example Men In Black). The application logic for this illustrative embodiment is further shown and summarized in the process flow 56 in FIG. 11. Depending on the type of asset, different actions are taken that are appropriate for that asset, as previously discussed with FIGS. 6 and 8-10.

Figure 12:
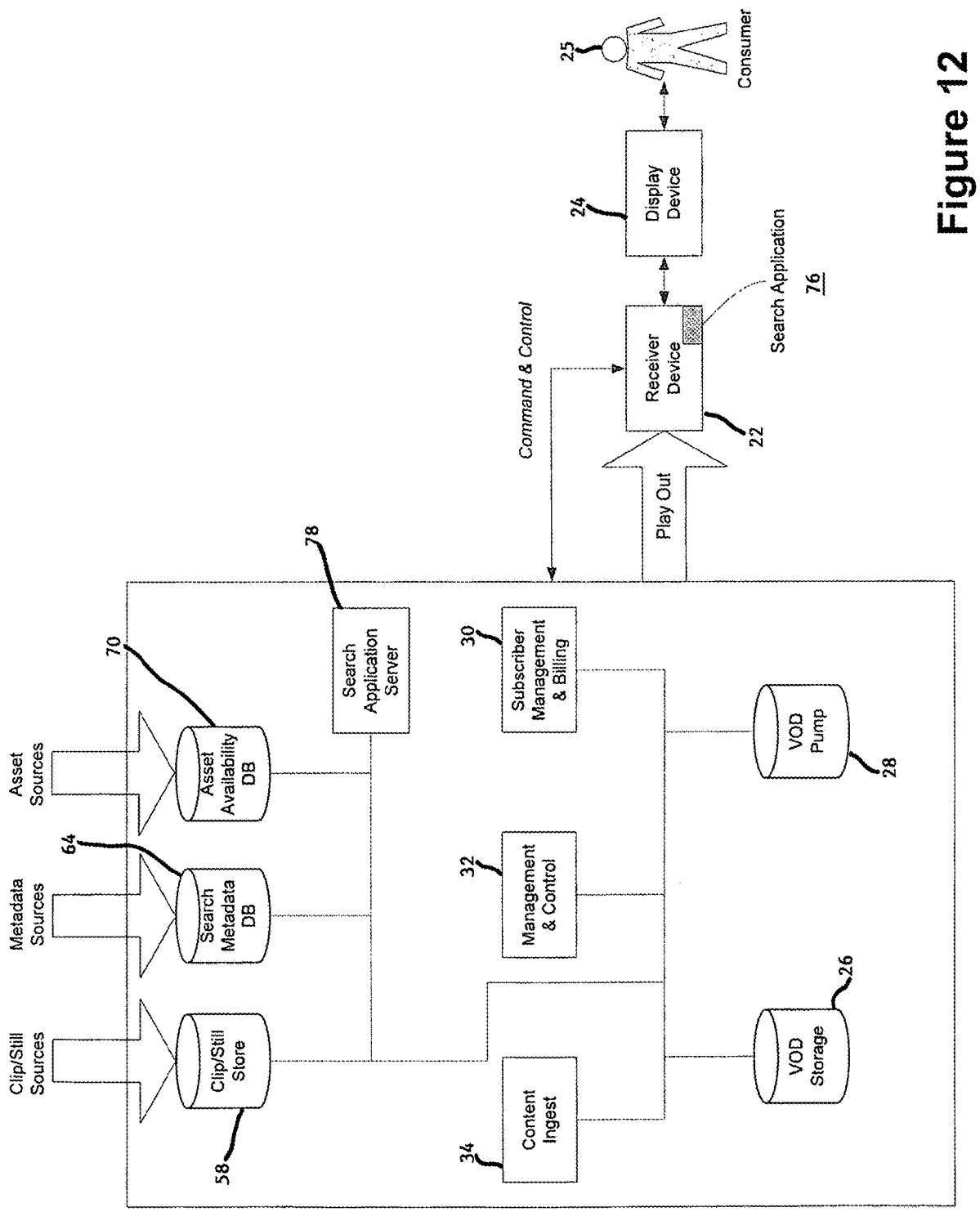
FIG. 12 illustrates a system diagram for an implementation of the illustrative embodiment.
Figure 13:
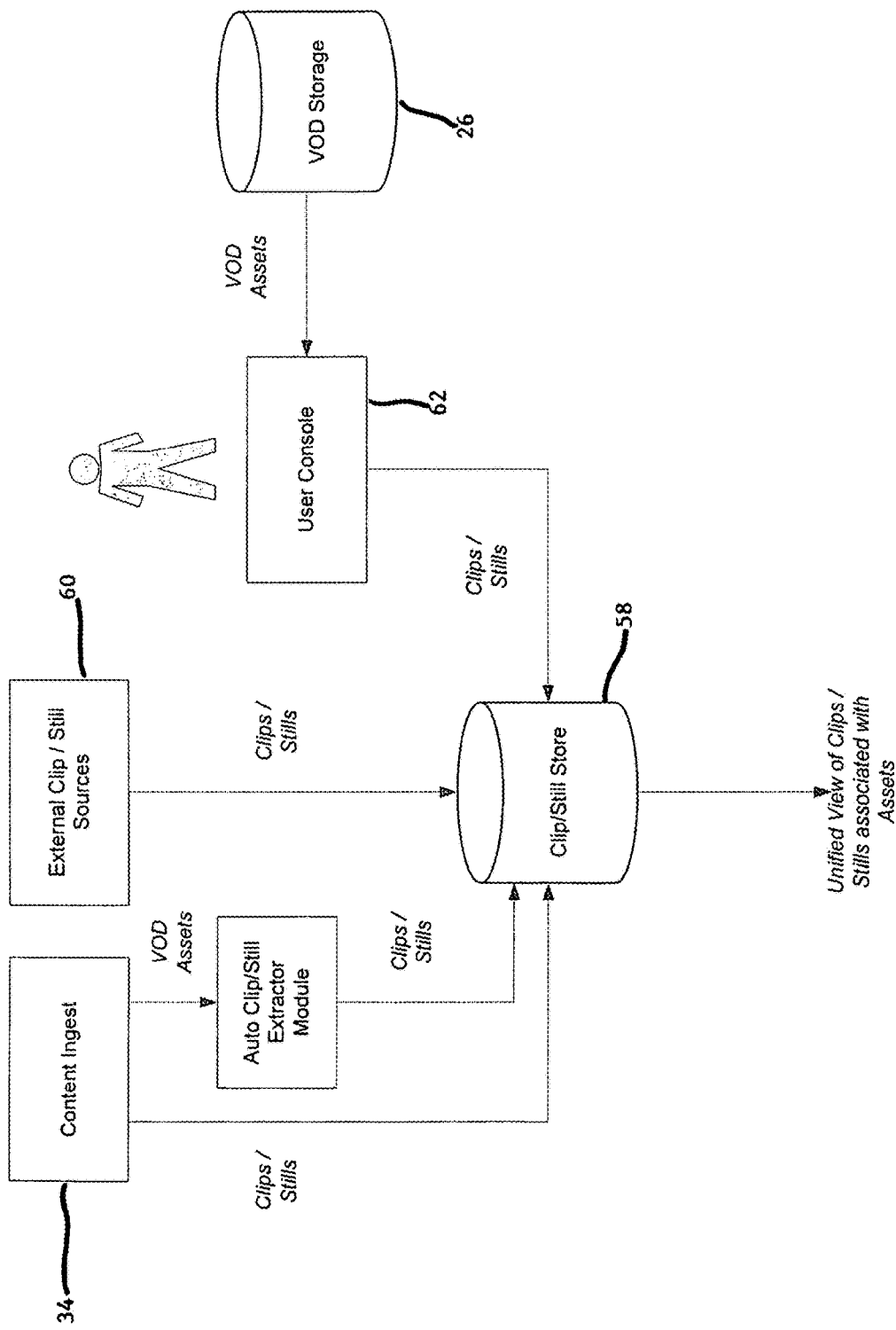
FIG. 13 illustrates an implementation of a Clip/Still Store component.

An implementation of this illustrative embodiment in a cable head end will now be discussed. This implementation is illustrated in FIG. 12. The Clip/Still Store component 58 is illustrated in greater detail in FIG. 13. It stores and manages previews, trailers, and still pictures that are associated with assets that are available to the consumer. It provides a unified database of various trailers and stills that are associated with an asset. It gets its information from various sources. First, whenever new content enters the VOD system, the Content Ingest module 34 notifies the Clip/Still Store component 58. If the new content already has associated clips/stills for preview, the Clip/Still Store component 58 simple administers and stores it for later use. If no clips/stills are associated with it, the Clip/Still Store component 58 may automatically extract appropriate clips/stills from it. Information supplied with the asset or obtained separately may provide one or more appropriate time/frame references for clips or stills from that asset. Second, the Clip/Still Store 58 may be connected to a variety of internal and external sources of clips and stills 60. Examples of these sources are online Internet Movie Databases ("www.imdb.com), or libraries of VOD and other content. Third the Clip/Still Store 58 may have a user interface 62 that allows operators to manually extract clips and stills from an asset.

Figure 14:
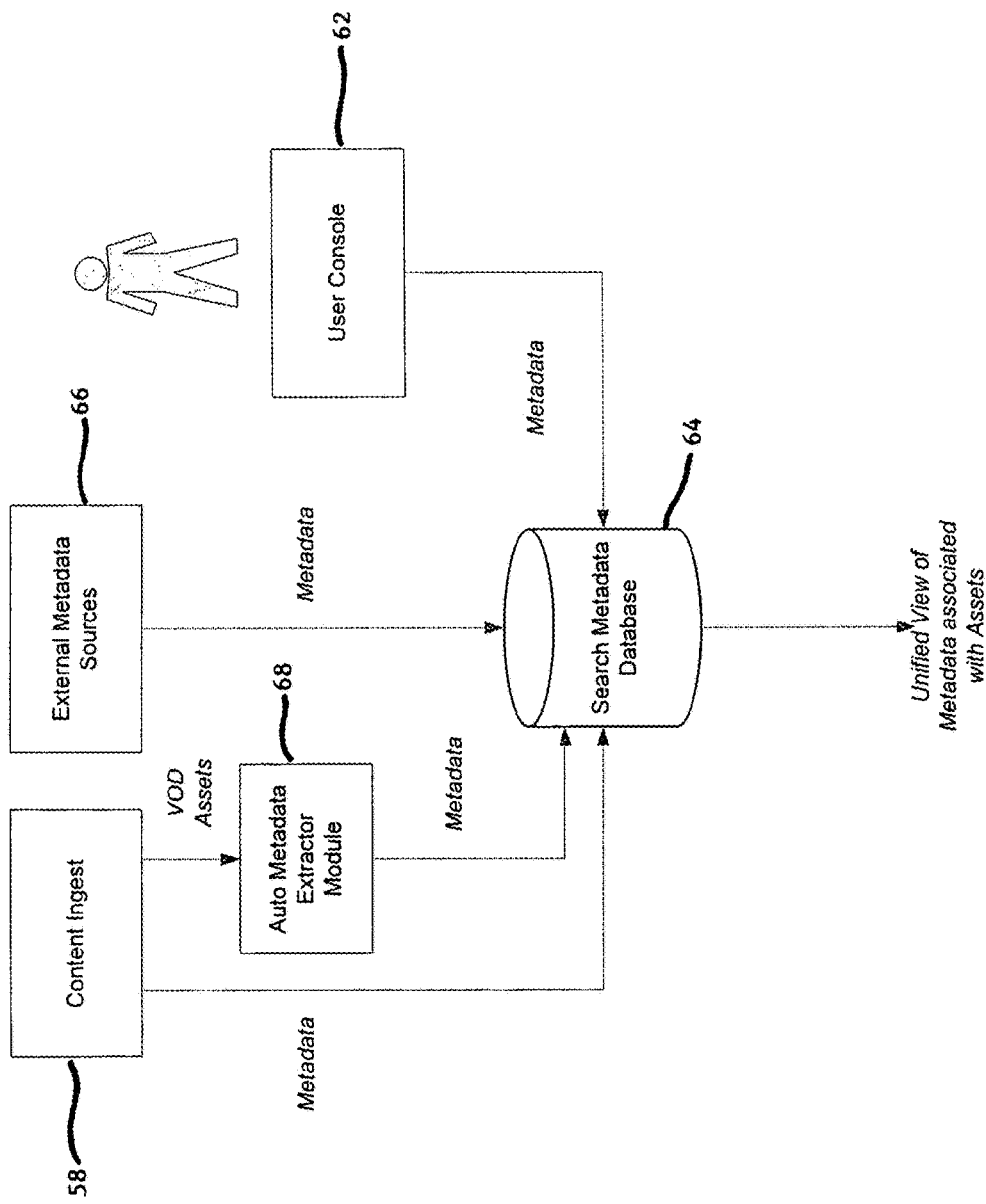
FIG. 14 illustrates an implementation of a Search Metadata Database component.

Another main system component is the Search Metadata Database (DB) 64, FIG. 12, as detailed in FIG. 14. This component 64 provides unified metadata for all assets that are available to the consumer. It also provides interfaces to search for assets based on metadata values. The Search Metadata Database 64 gets its information from various sources. First, whenever new content enters the VOD system it will typically come with metadata (for example, see the Cablelabs Metadata Specification, . . . ), so the Content Ingest module 58 will notify the Search Metadata Database who then administers and stores the metadata. Second, the Search Metadata Database is connected to a variety of internal and external metadata sources 66. These can be public sources (such as IMDB described below), or libraries of VOD or other content. Third, the Search Metadata Database 64 may have a system 68 for automatically extracting metadata from the content. Some examples of this include inspecting closed captioning information, image analysis for finding words for the opening and/or closing credits, comparison and matching to databases of actors and directors etc. and any combination thereof. For example the present invention may use a combination of scanning of closed captioning data, combined with pattern recognition software to establish the genre of a movie. Also there may be scene detection algorithms to locate the opening and closing credits of a movie, and then the use of character recognition algorithms to determine actors and directors automatically. Also, audio (music) maybe analyzed to determine genre of a movie, or even recognize specific movies. Further, voice recognition systems may be used to determine actors.

Fourth, the Search Metadata Database 64 may have a user interface 62 whereby operators can attach metadata to content.

Figure 15:
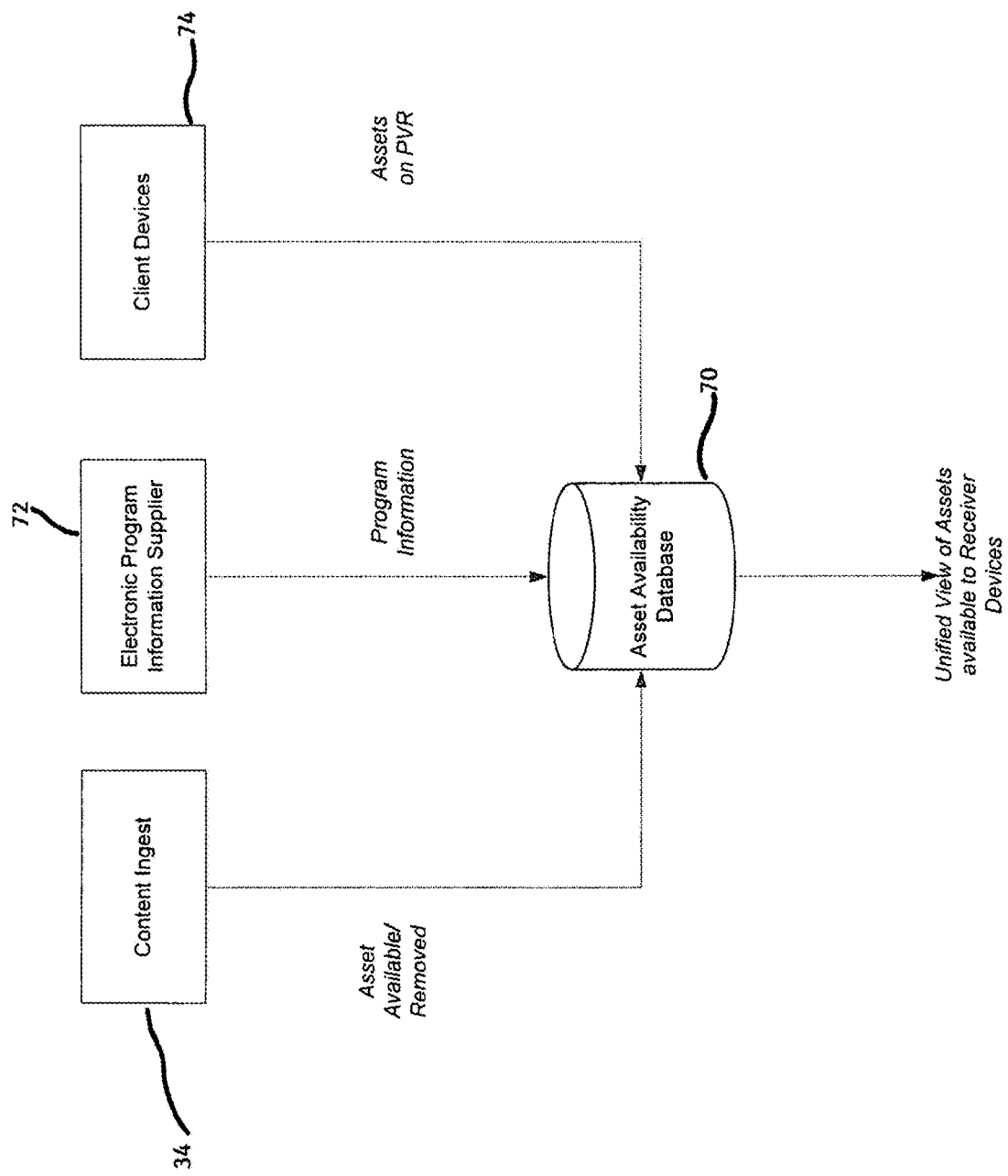
FIG. 15 illustrates an implementation of a Asset Availability Database component.

Another main component is the Asset Availability Database 70 FIG. 12, as detailed in FIG. 15. This database 70 keeps track of which assets are available to the consumer at any point in time. It gets its information from a variety of sources. First, whenever new content enters the VOD system, the Content Ingest module 34 will notify the Asset Availability Database 70 to record and administer the presence of the asset (or delete it if the asset has been removed from the VOD system). Second, the Asset Availability Database 70 is connected to an electronic source of Program Information 72 (this information is typically supplied to cable operators to populate the Electronic Program Guides in the digital set-top boxes, an example of a supplier of electronic program information in the US is Tribune Data Services). The Asset Availability Database 70 uses this information to keep track of which assets/programs are available for viewing or recording on the various networks in the coming weeks. Third, the Asset Availability Database 70 periodically collects data from all digital receivers 74 that have PVR capability, this information specifies which assets each individual receiver has currently stored and available on its local hard disk drive or other storage medium. This information is typically collected in the background, to not disrupt cable system behavior (e.g. at night). The Asset Availability Database 70 normalizes all this data, and can generate a list of all assets that are available to a specific digital receiver 74 according to the following formula:

Assets_available_to_receiver=
IF (receiver_has_PVR)
THEN (assets_available_on_VOD+assets_present_in_program_information)+assets on PVR)
ELSE (assets_available_on_VOD+assets_present_in_program_information)
END Another main component of the system is the Search Application 76, FIG. 12. This application resides in the Receiver Device 22 at the consumer's premise. It can be an embedded application, a downloadable application, or a built-in feature of another Receiver Device application (such as the Electronic Program Guide). The Search Application 76 has two major functions. First, whenever the consumer initiates enhanced search mode, it will set up a connection with the Search Application Server 78 in the back-end, and handle the user interface to the consumer (according to flow chart in FIG. 11), it will request all metadata, stills, and video play out functions from the Search Application Server 78. Second, in case the Receiver Device 22 includes a PVR, it will periodically send a list of assets available on PVR back to the Asset Availability Database 70 in the back-end. A final main component of the system is the Search Application Server 78. This server acts as the engine of the application, whenever a consumer initiates enhanced search mode, the Search Application Server 78 receives a request to open a search session, and inside that session it will continue to get requests for metadata, stills, or video play outs. The Search Application Server 78 in turn will interact with the Clip/Still Store 58 to retrieve clips or stills, to the Search Metadata Database 64 to retrieve metadata, the Asset Availability Database 70 to find lists of available assets, and the VOD Storage and/or VOD Pump components to play out trailers and/or VOD assets.

Figure 16:
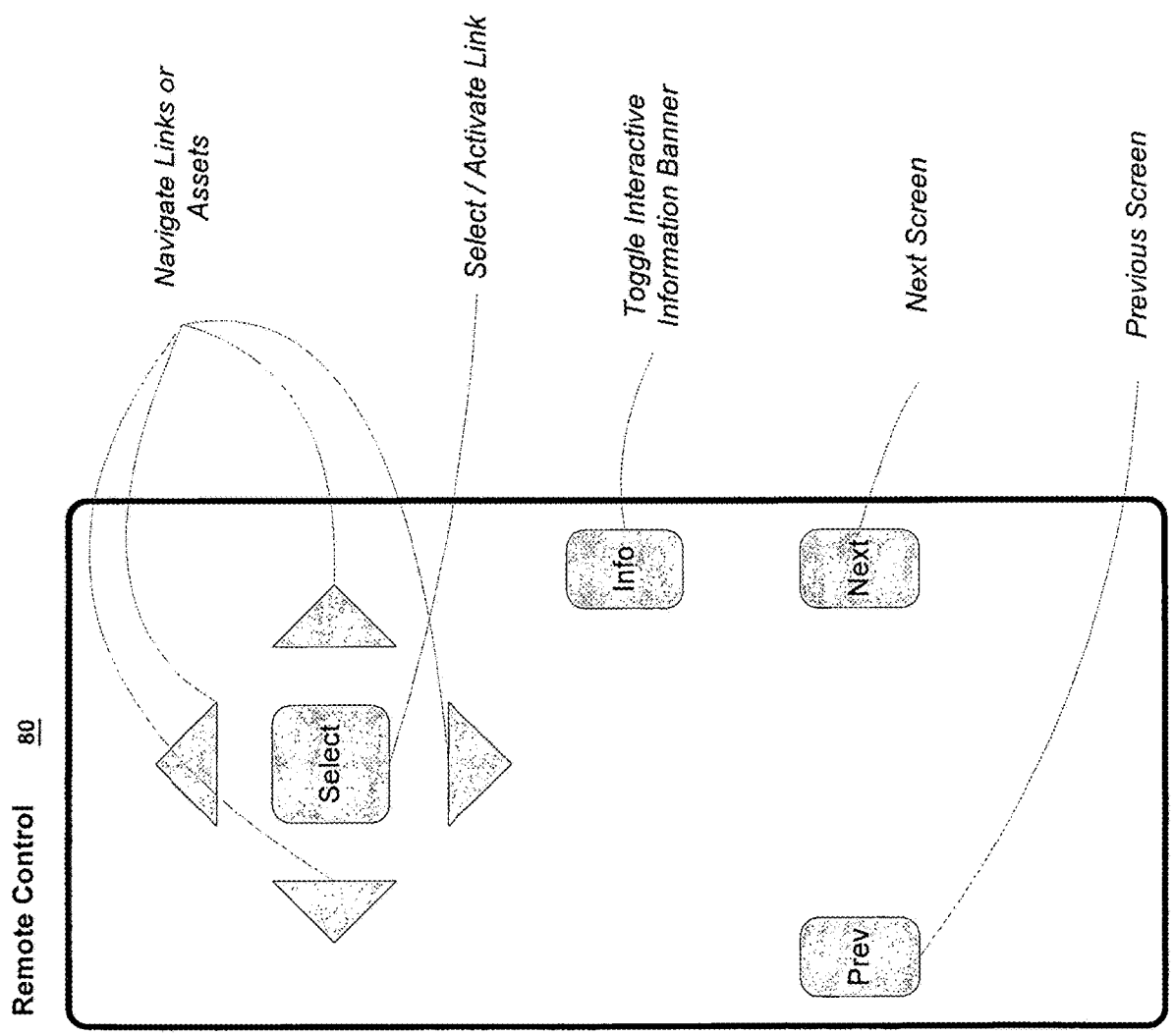
FIG. 16 illustrates a possible mapping of user inputs commands to an existing remote control.

One of the advantages of the present invention is that the required.user input from the consumer can easily be mapped on an existing remote control device, thus avoiding the need for more complex input devices such as remote keyboards. In other words, it is straightforward to map all required user inputs on existing keys on existing remote controls. A sample mapping on remote control 80 keys is shown in FIG. 16 (note: this is only one of the possible mappings, also note that only the keys associated with this application are shown, in reality there will be plenty of other keys as well).

The implementation describes only one possible embodiment of the present invention. It should be clear to anyone skilled in the art that the invention can also be implemented in alternative embodiments and implementations. Without attempting to be comprehensive, alternative embodiments will now be disclosed.

Figure 17:
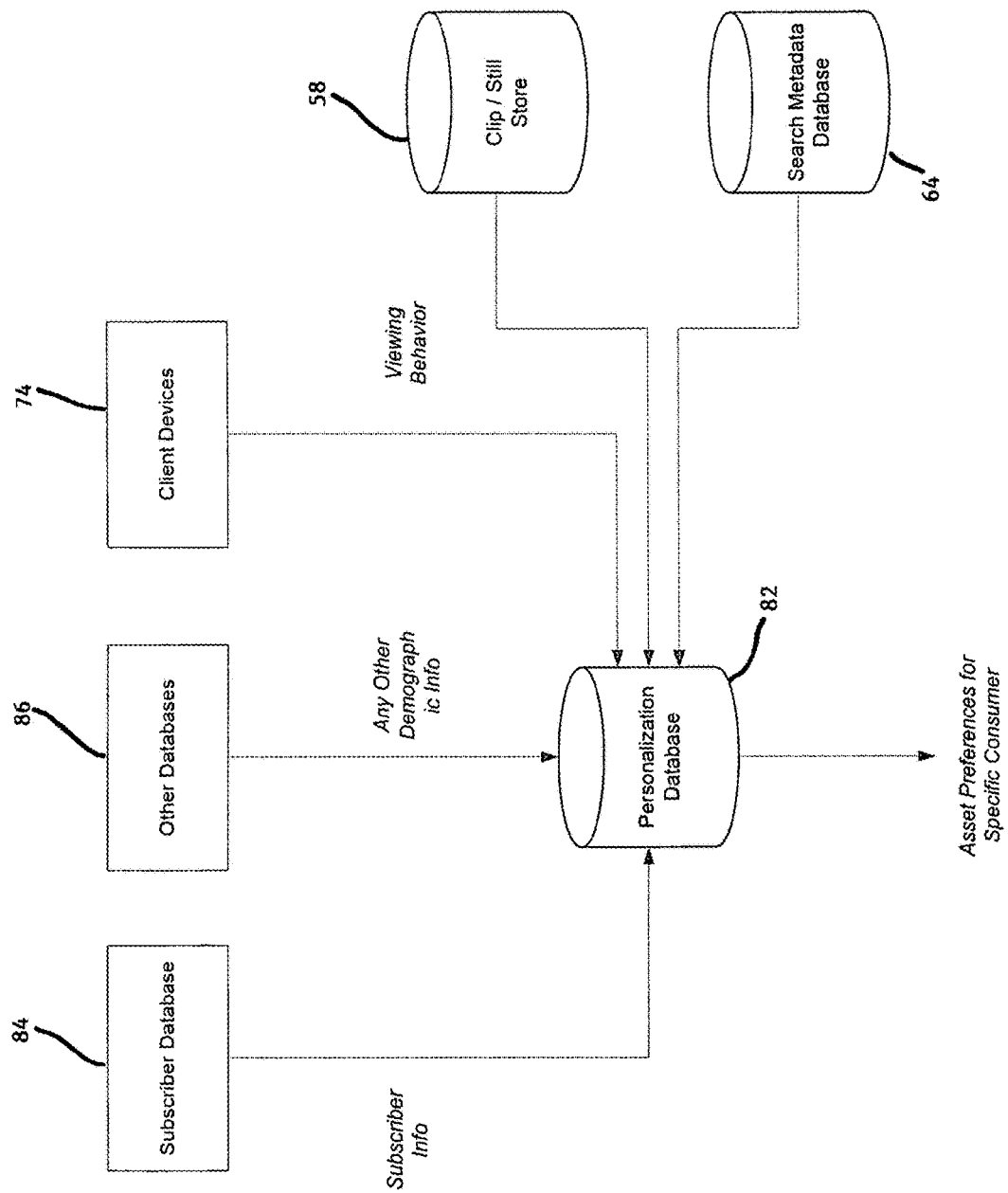
FIG. 17 illustrates an implementation of the Personalization Database component.

One major enhancement to the previously described embodiment is to add personalization to the system. This would further refine the user interface to the personal preferences or history of the consumer. For example if a consumer is presented with all Will Smith movies, the system may take into account that the consumer is interested in Sci-Fi movies, and it would present the Will Smith movies from the Sci-Fi category first. Also the stills and clips could be personalized. For example different aspects of the movie may be highlighted to appeal to different personal profiles (the movie "Pearl Harbor" may be presented as a love story to someone interested in romantic movies, and as a war movie for someone interested in war movies, this would result in different clips and stills to be shown to represent the same movie). Such a feature could be implemented by adding a Personalization Server 82 to the back-end 20 infrastructure. This Personalization Server 82 is illustrated in FIG. 17. The purpose of this server 82 is to maintain personal profile information for each potential user of the system (consumer). The personalization server 82 builds and maintains these profiles from various inputs. First, it may get subscriber information from the cable operator's subscriber database 84. This information may include some basic demographics (gender), past VOD buying behavior, etc. Second, it may get information from other (external) demographic databases 86 with more detailed demographics (income, etc.). Examples of such database providers in the US include Axiom, InfoUSA. Third, it may collect viewing behavior from the various client devices 74. This may include information on what programs are watched most frequently, etc. The Personalization Database 82 will normalize all this information, and then apply it to the Clips/Stills collection 58 that is available, and to the metadata collection 64 that is available, and it will select the most appropriate Clips/Stills for a given consumer and/or customize the descriptive text or metadata towards a specific consumer.

Figure 18A:
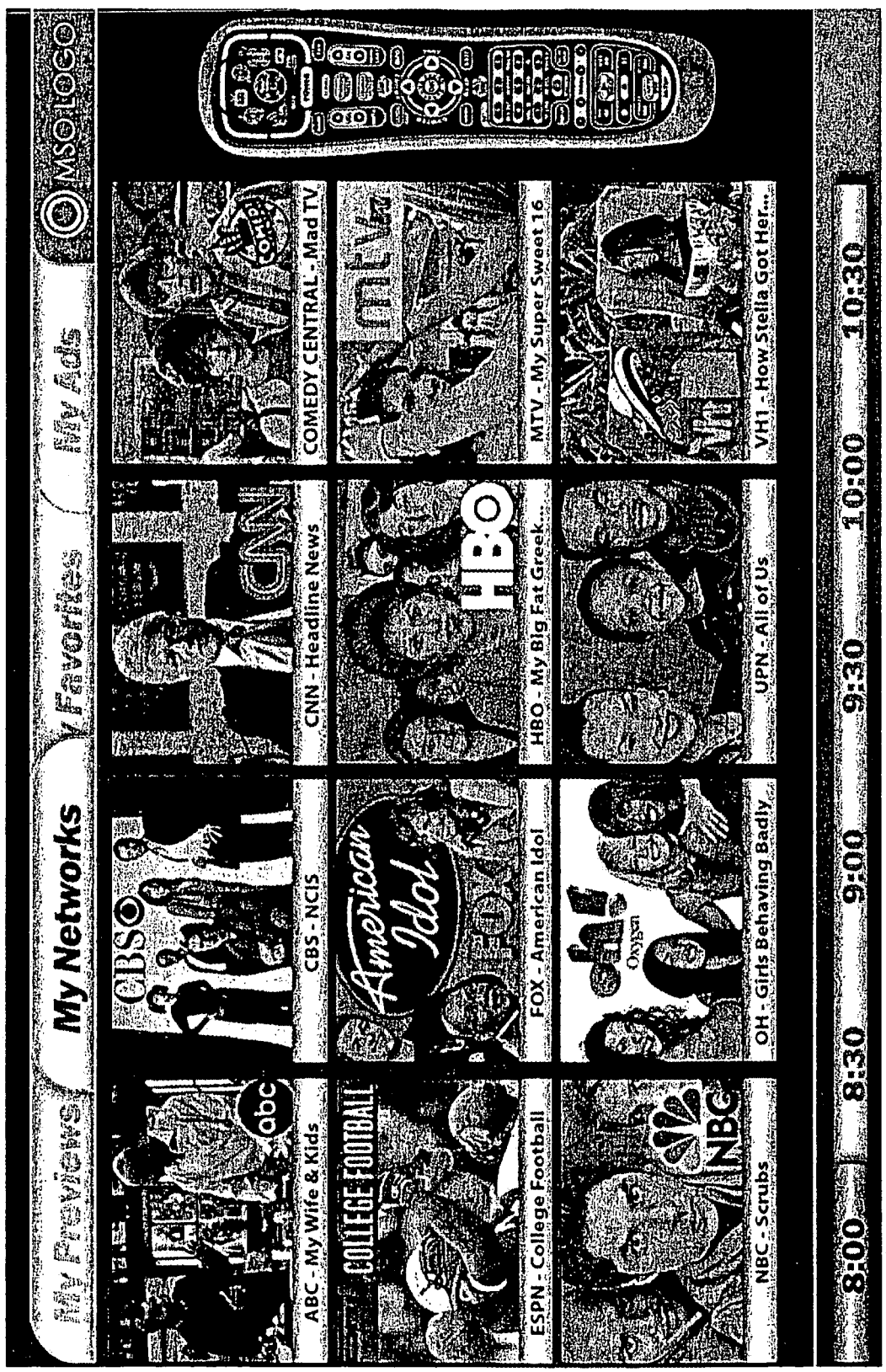
FIG. 18A-D illustrate example screen views of an embodiment.
Figure 18B:
Figure 18C:
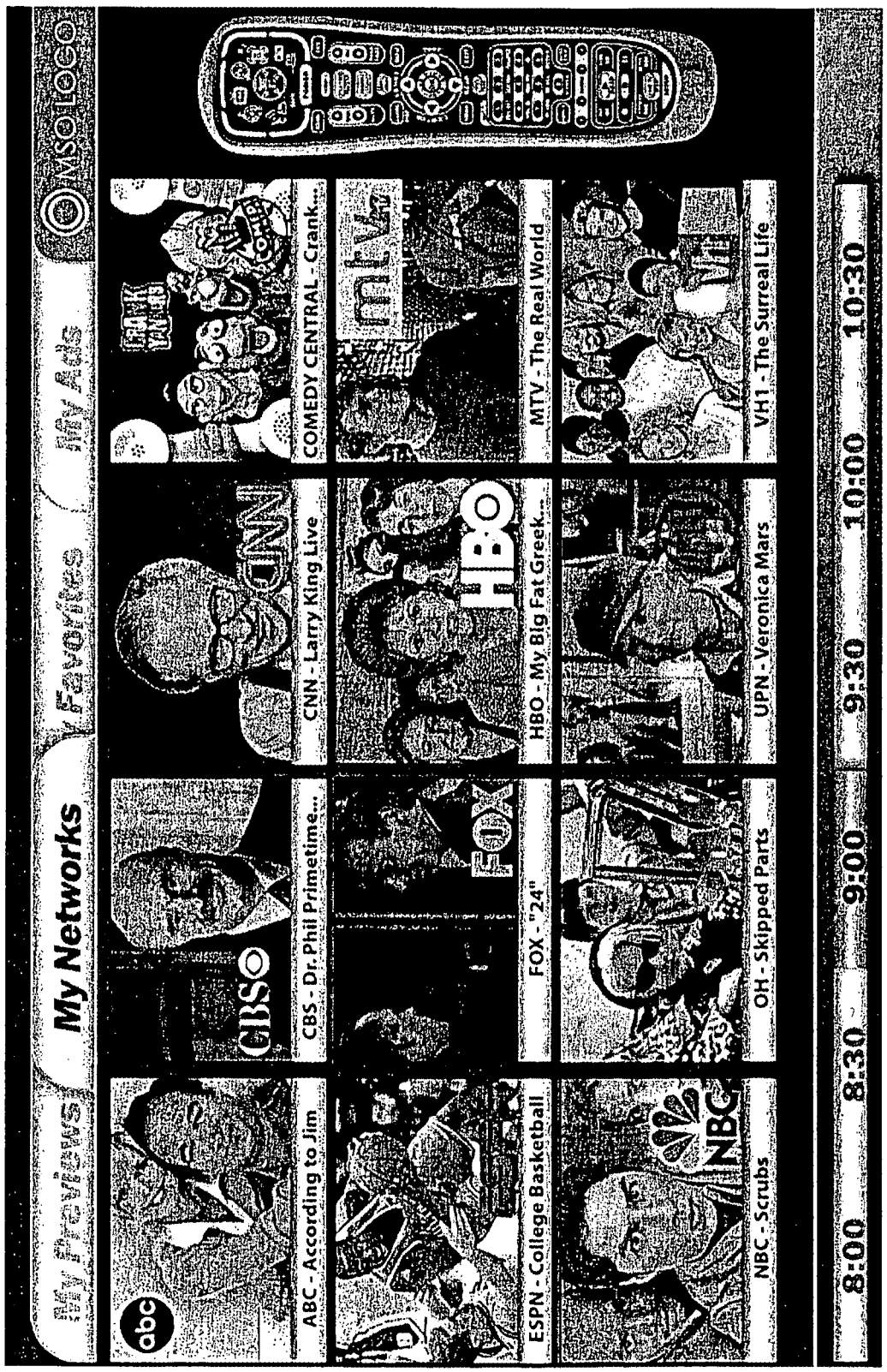
Figure 18D:

FIGS. 18A-18D show example screen shots according to an embodiment of the invention. The images of television shows in these figures (and the subsequent figures) are for exemplary purposes only, and no claim is made to any rights for the shows displayed. All trademark, trade name, publicity rights and copyrights for the exemplary shows are the property of their respective owners. FIG. 18A shows a display for video assets which for this example are broadcast shows arranged by viewing time. The broadcast shows are displayed with a still or moving image of the broadcast show, also a network logo is included as part of the image, superimposed or combined with the image. A user can use a remote control to highlight a selected broadcast show for viewing or to interactively obtain further information about the highlighted broadcast show. The user is not required to deal with channels or other underlying details of video asset delivery, but can simply navigate by more familiar terms, in this case by network. Further, the user may selectively add or remove entities (and arrange the order of the displayed networks) from the display, to personalize the display for that user. FIGS. 18B-D show different displays based on selected time slots as shown on the bottom of the image.

Figure 19A:
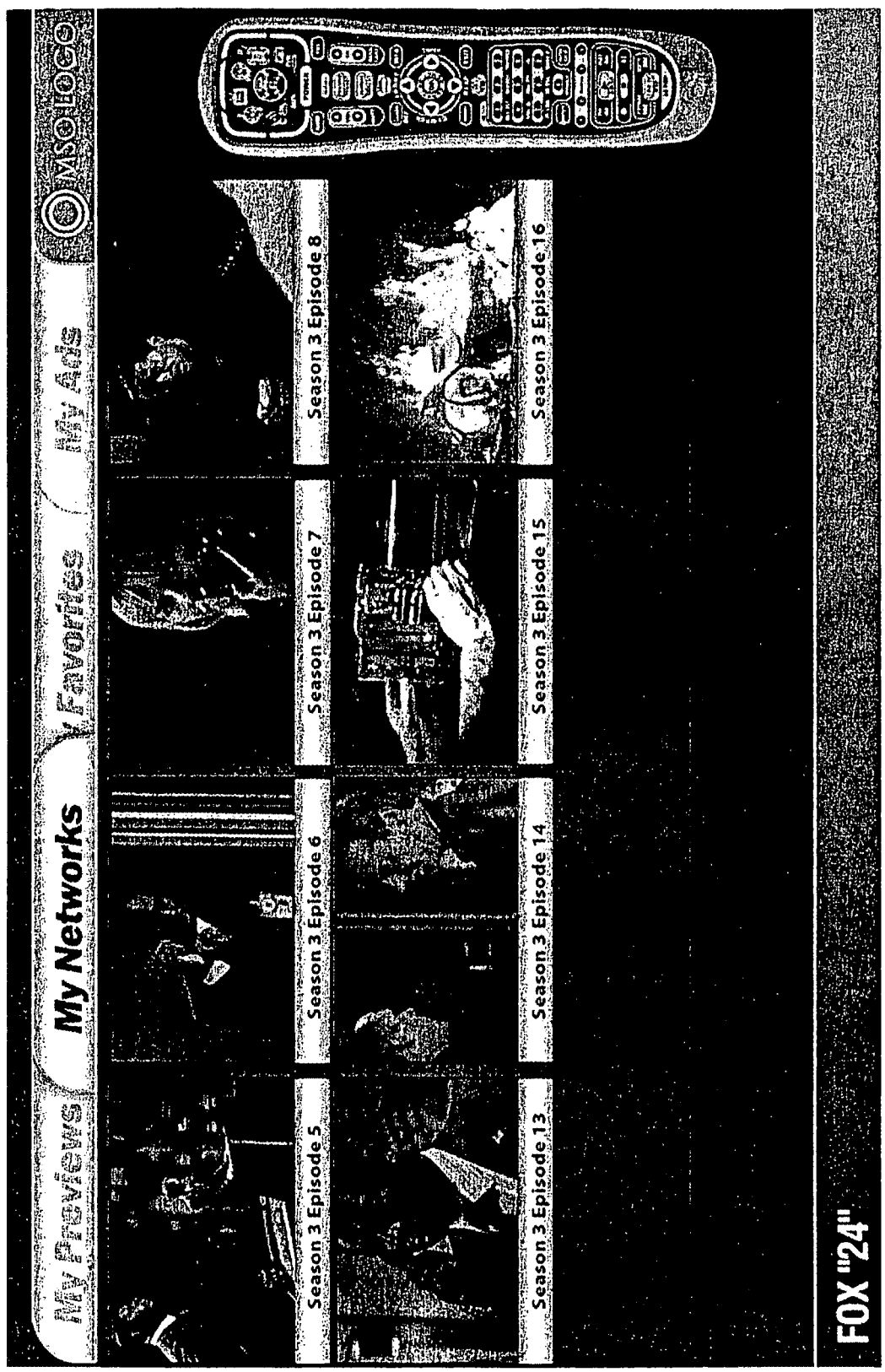
FIG. 19A-B illustrate other example screen views for the embodiment of FIG. 18.
Figure 19B:
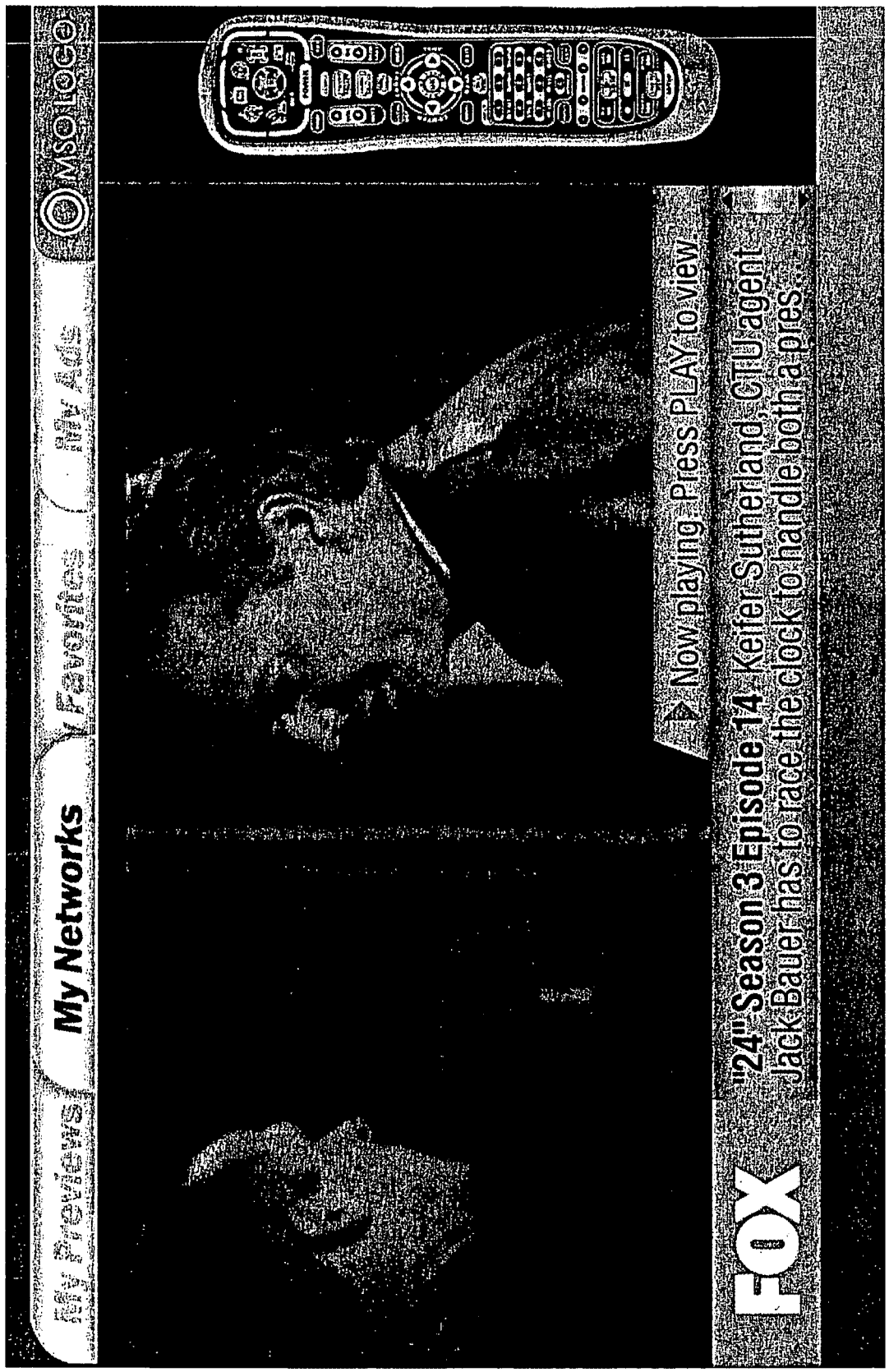

FIG. 19A shows another screen shot from this embodiment, in this case the user is viewing video assets for a particular show, where the video assets are available from a source such as video on demand, library, or other delivery service. The user can easily select a certain episode for viewing, or to obtain further information, for example as shown in FIG. 19B. As previously described, a user can have the ability to search for other video assets based on information and meta-data categories that are displayed with the image.

Figure 20:
FIG. 20 illustrates another example screen view for the embodiment of FIG. 18.

FIG. 20 shows another screen shot from this embodiment, wherein a user may navigate using tabs positioned along a top of the display, and select different categories of video assets. In the present example, the user has selected a category of "My Favorites", and is shown a selection of video assets for viewing. As shown in this figure, the video assets are available from a wide variety of sources, including DVD, broadcast, and pay per view broadcast. The user is able to select a video asset (through highlighting interactivity with a remote, or otherwise) for viewing from a vast number of video asset sources. Further, the user can navigate to other similar video assets (based on the meta-data categories) using the video assets presently listed in this favorite category.

Figure 21:
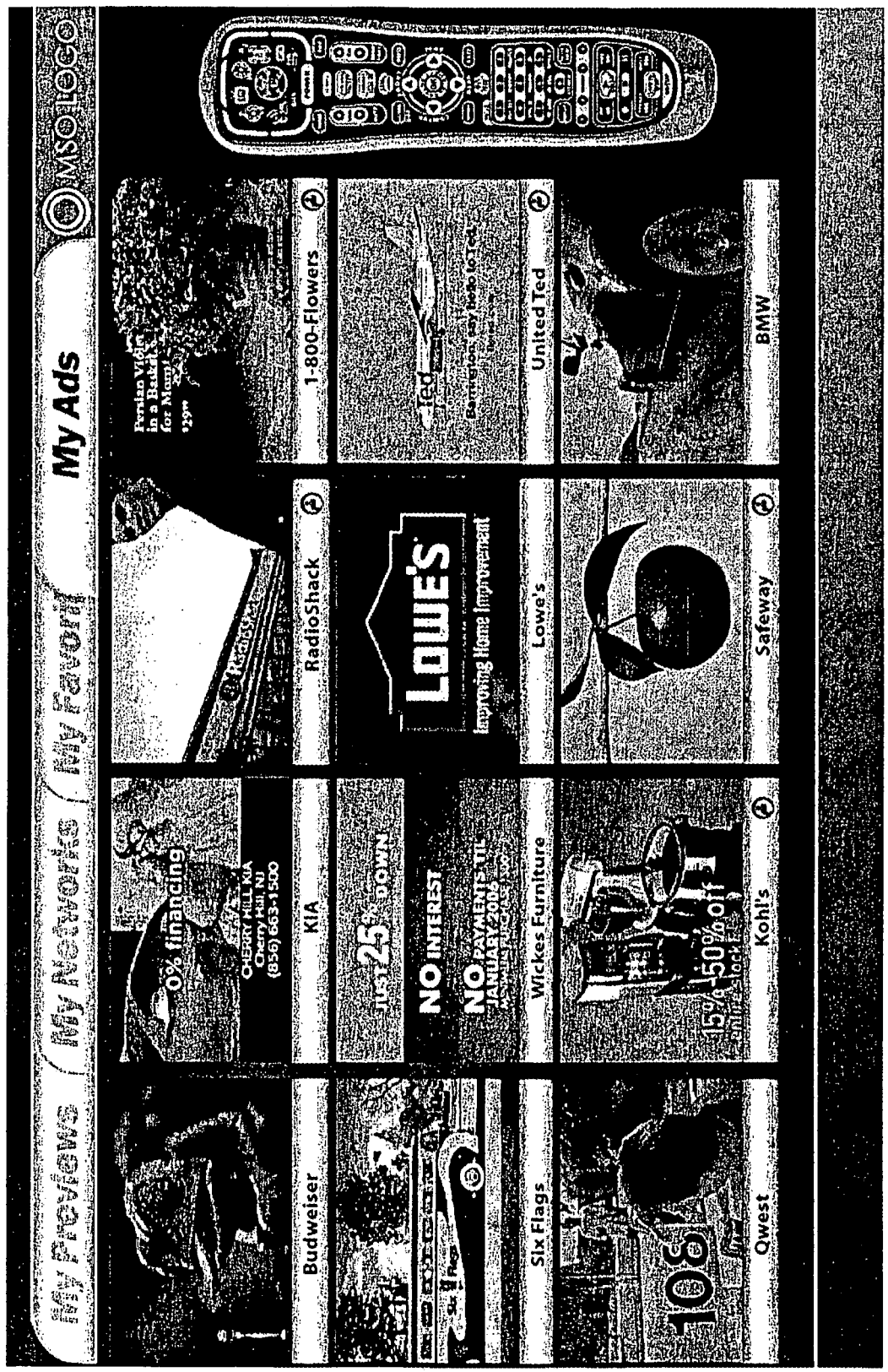
FIG. 21 illustrates another example screen view for the embodiment of FIG. 18.

FIG. 21 shows another screen shot from this embodiment, which shows the ability to provide advertisements, interactive shopping experiences or special offers to users. As shown in the image, selection of advertising assets are presented to the user, to allow the user to interact by selection and thereby view and/or receive special offers from such advertisers. A visual indication on an image can alert the user to a special offer or interactive opportunity for certain advertisements. The user has the ability to use meta-data categories to search for other advertisers or suppliers of goods and services, for example to search for other amusements parks based on a meta-data category for one image and advertisement for an amusement park.

Another implementation variation is to selectively use still pictures instead of video previews/trailers. This has a number of advantages: first still pictures may be more readily available than previews/trailers, especially for content that is available through other means than VOD (e.g. content that shows up in the Guide for two weeks from now), second this could limit the bandwidth consumption (still pictures take considerably less bandwidth and storage than moving video). Bandwidth use can be further limited by sending the still pictures in so-called broadcast carrousels and to have them stored at each client device 74 when needed (as opposite to sending them to the client device on request when needed). Broadcast carrousels are a well known bandwidth saving technique in the digital video industry (an example is the DSM-CC Data Carrousel). It is within the scope of the invention to modify the system in such a way that it detects shortage of bandwidth, and then switches over to more bandwidth friendly techniques (stills), and switch back to using motion video when bandwidth is more available again.

Another implementation variation is to "auto cue" additional previews/trailers after the consumer is finished watching a preview. In other words: if a user previews the "Ali" preview and does not decide to buy the movie, or exit the application, the system may automatically start playing the next relevant preview (instead of going back to the Browsing Screen). It is possible to enhance the system in such a way as to effectively create an interactive movie barker channel (continuously playing relevant trailers).

Another implementation variation is to load trailers to hard disks of PVR-enabled Receiver Devices. This would allow these trailers to be played out from local hard disk (even if they refer to a movie asset that is available on VOD, or as linear programming). The trailers could be downloaded when bandwidth is available (e.g. at night), and this would also make the system much more bandwidth efficient.

Another implementation variation is to use the system to represent assets from additional sources (in addition to, or instead of, VOD and PVR and linear programming). Examples would include: assets that are available via Broadband IP networks, assets that are available on DVD or DVD-Recorder, assets that are available via Digital Terrestrial networks, assets that are available via Direct-To-Home (DTH) satellite, assets that are available on Near-Video-On-Demand (NVOD) channels, assets that are available via Subscription-Video-On-Demand (SVOD), etc. Further, assets can be downloaded from a network or path that does not provide enough bandwidth for real-time viewing. The asset may be downloaded to the PVR, and the consumer can be alerted when the asset is fully downloaded, or alternatively, when enough of the asset is downloaded to allow the consumer to begin viewing from the PVR while downloading continues in parallel (in effect using the PVR as a buffering system).

Another implementation variation is to change the User Interface Look & Feel to accommodate different flavors of interfaces. The system may easily be modified to provide different views or representations of the video (either as still picture or as moving video) in combination with a representation of metadata. Also different input devices can easily be supported (more advanced remote controls, keyboards, media control center counsels, etc.).

Another implementation variation is to give viewers more control/preview capabilities by presenting them with a screen that shows them the various parts of the movie that they are (about to) see. This screen can look very similar to the metadata browsing screen (or the scene selection screen typically used in many DVD titles today), and allow the viewer to get a better understanding of the flow of the movie, and give the viewer control to navigate the movie in a more user friendly manner.

Another implementation variation is to use moving video in the metadata browsing screen (instead of still pictures). The various assets can be shown as moving pictures, and only the audio of the currently selected asset would be rendered. In order to make implementation easier, the moving pictures can be low-quality, or even animated still pictures.

Although the invention has been shown and described with respect to illustrative embodiments thereof, various other changes, omissions and additions in the form and detail thereof may be made therein without departing from the spirit and scope of the invention.

What is claimed is:

1. A method comprising:
   receiving a search request for a media asset, wherein the search request comprises a search category;
   identifying a plurality of media assets related to the received search request, wherein each identified media asset includes at least one still image and one video clip;

automatically cuing playing of the video clips associated with the plurality of identified media assets;
playing a first representative clip from a first media asset, from the plurality of identified media assets, based on the automatic cuing;
detecting a bandwidth shortage prior to automatically playing a second representative clip from a second media asset, from the plurality of identified media assets; and
in response to detecting the bandwidth shortage, switching from playing the second representative clip to displaying a still image associated with second media asset.

2. The method of claim 1, wherein automatically cuing playing of the video clips comprises cuing a next relevant video clip after ending of playing of the first representative clip from the first media asset.

3. The method of claim 2, further comprising:
detecting that the bandwidth shortage has ended; and
in response to detecting that bandwidth shortage has ended, switching from displaying the still image associated with second media asset to playing the second representative clip from the second media asset.

4. The method of claim 1, further comprising:
determining whether a selection of the first media asset is received after playing the first representative clip from the first media asset; and
in response to determining that the selection of the first media asset is not received, continuing to automatically play a next cued representative clip from a next media asset, from the plurality of identified media assets.

5. The method of claim 1, further comprising:
monitoring availability of bandwidth during playing of a representative clip or a still image; and
switching between still images and video clips based on the monitored bandwidth.

6. The method of claim 1, further comprising:
downloading a third representative clip from a third media asset, from the plurality of identified media assets, to a personal video recorder (PVR);
detecting a bandwidth shortage when the third representative clip is to be played; and
in response to detecting a bandwidth shortage when the third representative clip is to be played, switching to the PVR to play the downloaded third representative clip.

7. The method of claim 6, wherein the downloading of the third representative clip to the PVR is performed at a time when bandwidth for downloading is available.

8. The method of claim 1, wherein the plurality of identified media assets are from separate sources.

9. The method of claim 2, further comprising:
receiving a selection of the first media asset in response to playing of the first representative clip from the first media asset; and
terminating automatic cuing in response to receiving the selection of the first media asset.

10. The method of claim 1, wherein the bandwidth shortage is detected after completion of the first representative clip from the first media asset.

11. A system comprising:
input/output circuitry configured to:
receive a search request for a media asset, wherein the search request comprises a search category;
identify a plurality of media assets related to the received search request, wherein each identified media asset includes at least one still image and one video clip;
automatically cue playing of the video clips associated with the plurality of identified media assets;
play a first representative clip from a first media asset, from the plurality of identified media assets, based on the automatic cuing;
detect a bandwidth shortage prior to automatically playing a second representative clip from a second media asset, from the plurality of identified media assets; and
in response to detecting the bandwidth shortage, switch from playing the second representative clip to displaying a still image associated with second media asset.

12. The system of claim 11, wherein automatically cuing playing of the video clips comprises input/output circuitry configured to cue a next relevant video clip after ending of playing of the first representative clip from the first media asset.

13. The system of claim 12, further comprising, input/output circuitry configured to:
detect that the bandwidth shortage has ended; and
in response to detecting that bandwidth shortage has ended, switch from displaying the still image associated with second media asset to playing the second representative clip from the second media asset.

14. The system of claim 11, further comprising, input/output circuitry configured to:
determine whether a selection of the first media asset is received after playing the first representative clip from the first media asset; and
in response to determining that the selection of the first media asset is not received, continue to automatically play a next cued representative clip from a next media asset, from the plurality of identified media assets.

15. The system of claim 11, further comprising, input/output circuitry configured to:
monitor availability of bandwidth during playing of a representative clip or a still image; and
switch between still images and video clips based on the monitored bandwidth.

16. The system of claim 11, further comprising, input/output circuitry configured to:
download a third representative clip from a third media asset, from the plurality of identified media assets, to a personal video recorder (PVR);
detect a bandwidth shortage when the third representative clip is to be played; and
in response to detecting a bandwidth shortage when the third representative clip is to be played, switch to the PVR to play the downloaded third representative clip.

17. The system of claim 16, wherein the downloading of the third representative clip to the PVR is performed by the input/output circuitry at a time when bandwidth for downloading is available.

18. The system of claim 11, wherein the plurality of identified media assets are from separate sources.

19. The system of claim 12, further comprising, input/output circuitry configured to:
receive a selection of the first media asset in response to playing of the first representative clip from the first media asset; and
terminate automatic cuing in response to receiving the selection of the first media asset.

20. The system of claim 11, wherein the bandwidth shortage is detected by the input/output circuitry after completion of the first representative clip from the first media asset.

* * * * *